(12) United States Patent
Srivastava

(10) Patent No.: US 11,575,518 B2
(45) Date of Patent: Feb. 7, 2023

(54) UPDATEABLE SMART CONTRACTS

(71) Applicant: DLT Global Inc., Toronto (CA)

(72) Inventor: Neeraj Srivastava, Toronto (CA)

(73) Assignee: DLT GLOBAL INC., Toronto (CA)

( * ) Notice: Subject to any disclaimer, the term of this patent is extended or adjusted under 35 U.S.C. 154(b) by 105 days.

(21) Appl. No.: 17/043,520

(22) PCT Filed: Mar. 29, 2019

(86) PCT No.: PCT/IB2019/000463
§ 371 (c)(1),
(2) Date: Sep. 29, 2020

(87) PCT Pub. No.: WO2019/186282
PCT Pub. Date: Oct. 3, 2019

(65) Prior Publication Data
US 2021/0124722 A1    Apr. 29, 2021

Related U.S. Application Data

(60) Provisional application No. 62/650,183, filed on Mar. 29, 2018.

(51) Int. Cl.
*G06F 16/30* (2019.01)
*H04L 9/32* (2006.01)
(Continued)

(52) U.S. Cl.
CPC ........ *H04L 9/3236* (2013.01); *G06F 16/2358* (2019.01); *H04L 9/50* (2022.05)

(58) Field of Classification Search
CPC .............. G06Q 10/20; G06Q 20/1235; G06Q 20/2295; G06Q 20/065; G06F 16/219;
(Continued)

(56) References Cited

U.S. PATENT DOCUMENTS

2017/0046526 A1\* 2/2017 Chan ................. G06Q 20/0655
2017/0155515 A1\* 6/2017 Androulaki ............ H04L 9/008
(Continued)

OTHER PUBLICATIONS

International Application Serial No. PCT/IB2019/000463, International Search Report dated Aug. 16, 2019, 8 pgs.
(Continued)

*Primary Examiner* — Mahesh H Dwivedi
(74) *Attorney, Agent, or Firm* — Culhane Meadows, PLLC

(57) ABSTRACT

A parent/child model for smart contracts enables the smart contracts to be updateable without compromising the immutability of the underlying data. As a first step, a parent smart contract (Client Contract) is deployed that stores any other contract that may be called using the contract address. Then, whenever a new child smart contract (Service Contract) is deployed, the parent smart contract is updated with the address of the new child smart contract so that the parent smart contract will be able to call the child smart contract. The structure of the child smart contract is known to the parent smart contract. For example, the number of inputs going into the child smart contract and the number of outputs coming out of the child smart contract are known to the parent smart contract before deployment of the parent smart contract, and the transaction data remains accessible without affecting the parent contract.

23 Claims, 17 Drawing Sheets

(51) Int. Cl.
*G06F 16/23* (2019.01)
*H04L 9/00* (2022.01)

(58) Field of Classification Search
CPC ... G06F 16/2358; H04L 9/3236; H04L 63/12; H04L 2209/38; H04L 67/1097; H04L 9/50
See application file for complete search history.

(56) References Cited

U.S. PATENT DOCUMENTS

| | | | | |
|---|---|---|---|---|
| 2018/0005186 | A1* | 1/2018 | Hunn | G06F 21/645 |
| 2018/0248880 | A1* | 8/2018 | Sardesai | H04L 63/101 |
| 2019/0036778 | A1* | 1/2019 | Bathen | H04L 41/0893 |
| 2019/0080402 | A1* | 3/2019 | Molinari | G06Q 40/06 |
| 2019/0325044 | A1* | 10/2019 | Gray | G06Q 20/3829 |
| 2019/0332430 | A1* | 10/2019 | Qiu | G06Q 20/223 |
| 2020/0051069 | A1* | 2/2020 | Wilson | G06Q 20/389 |
| 2021/0264382 | A1* | 8/2021 | Leise | G06F 16/2255 |

OTHER PUBLICATIONS

International Application Serial No. PCT/IB2019/000463, Written Opinion dated Aug. 16, 2019, 17 pgs.
"Writing upgradable contracts in Solidity", Anonymous, XP055611138, [Online] Retrieved from the Internet: <URL: https://blog.colony.io/writing-upgradeabl e-contracts-in-soli di ty-6743f0eecc88/> [Retrieved on Aug. 6, 2019], (Jun. 18, 2016), 14 pgs.
David, Rugendyke, "Upgradable Solidity Contract Design—Rocket Pool—Medium", XP055611133, [Online] Retrieved from the Internet: <URL: https://medium.com/rocket-pool/upgradable-solidity-contract-design-54789205276d> [Retrieved on Aug. 6, 2019], (Nov. 21, 2017), 8 pgs.
Hassan, Abdel-Rahman, "Upgradable Contracts in Solidity—Cardstack—Medium", XP055611135, [Online] Retrieved from the Internet: <URL: https://medium.com/cardstack/upgradable-contracts-in-solidity-d5af87f0f913> [retrieved on Aug. 6, 2019], (Feb. 19, 2018), 15 pgs.

* cited by examiner

UPDATEABLE SMART CONTRACTS

CROSS-REFERENCE TO RELATED APPLICATIONS

The present application is a U.S. National Stage Filing under 35 U.S.C. 371 from International Application No. PCT/IB2019/000463, filed on Mar. 29, 2019, and published as WO 2019/186282 A1 on Oct. 3, 2019, which claims priority to U.S. Provisional Patent Application No. 62/650,183, filed. Mar. 29, 2018, and entitled "Updateable Smart Contracts", each of which is incorporated by reference herein in its entirety.

TECHNICAL FIELD

The application is directed to the design of an updateable smart contract or smart contracts for which updateability otherwise would be prevented or reduced by the coupling between each smart contract and its permanent data storage that is enforced by the blockchain or distributed ledger platform on which the smart contract executes.

BACKGROUND

Blockchain technology has the potential of bringing the biggest information technology revolution of this century or at least the first half of this century After the Internet revolution, the blockchain revolution is probably the biggest disruption so far which is challenging the weakest nerve of the Internet—the lack of trust Blockchain is the only technology to date which can bring trust to the internet by making data practically immutable.

Ethereum currently is one of the most widely used blockchain systems. Ethereum makes data immutable in older to create trust among nodes. Ethereum makes not only the values which are stored but also makes the program or smart contracts immutable. This means that if one has deployed a smart contract on Ethereum, that smart contract cannot be updated or modified once deployed.

Thus, immutability of data comes at a cost in that any future updates to the smart contract will not be possible. The inability to update the smart contract is impractical for many use cases and may lead to obsolescence of the smart contracts. The systems and methods described herein are designed to make smart contracts updateable without compromising the immutability of the underling data.

SUMMARY

The systems and methods described herein address the needs in the art by providing an architecture solution implemented as a parent and child model. As a first step, a parent smart contract is deployed that has the feature of storing a child smart contract address for a child smart contract that may be called using the child smart contract address. Then, whenever a new child smart contract is deployed, the parent smart contract is updated with the address of the new child smart contract so that the parent smart contract will be able to call the new child smart contract. The only limitation here is that the structure of the child smart contract is known to the parent smart contract. For example, the number of inputs going into the child smart contract and the number of outputs coming out of the child smart contract are known to the parent smart contract before deployment of the parent smart contract. In certain embodiments described herein, the parent smart contract is the calling smart contract and is, not updateable while the child smart contract is the called smart contract and is updateable, in this situation, the calling (parent) smart contract is informed as to how to make calls to its updated called (child) smart contract. On the other hand, in other embodiments described herein, the called (child) smart contract is not updateable and the calling (parent) smart contract is updateable. In this situation, the calling (parent) smart contract is updated to a new version, it simply continues to make use of the called (child) contract, whose address is unchanged, as its predecessor calling (parent) smart contract did.

In sample embodiments, the systems and methods more generally relate to the design of a smart contract or smart contracts for which updateability otherwise would be prevented or reduced by the coupling between each smart contract and its permanent data storage that is enforced by the blockchain or distributed ledger platform on which the smart contract executes, as is the case on common smart contract platforms like Ethereum. In such sample embodiments, each notional smart contract is divided into separate updateable and non-updateable smart contracts where the division of each smart contract's functionality is such that any direct usage of the platform's permanent data storage becomes a part of the functionality of the non-updateable smart contracts and at least some of the part of the remaining functionality resides in the updateable smart contract, whereby any existing or future techniques for the interoperating of the smart contracts may be used to achieve the same combined functionality as would have been achieved using the original notional smart contract. Also, any existing or future techniques for directing a smart contract to begin interoperating with another smart contract may be used in conjunction with the original or subsequent deployment of the updateable smart contract to enable interoperability.

Sample embodiments include a method for updating a smart contract implemented on a blockchain by segregating the smart contract into an updateable smart contract and a non-updateable smart contract connected via a fixed interface. The non-updateable smart contract handles persistent data storage and retrieval to the blockchain for data that needs to be permanently accessible and the updateable smart contract does not contain data storage and retrieval to the blockchain. The non-updateable smart contract and a first version of the updateable smart contract are deployed, and the non-updateable smart contract is provided with an address of the first version of the updateable smart contract via the interface. The non-updateable smart contract stores the address of the first version of the updateable smart contract to the blockchain. The non-updateable smart contract may retrieve permanent data from the blockchain and pass the permanent data to the first version of the updateable smart contract via the interface. In operation, the updateable smart contract performs a computation on the permanent data and returns updated data based on the computation of the permanent data back to the non updateable smart contract via the interface, and the non-updateable smart contract stores the updated data to the blockchain.

In other sample embodiments, a method for updating a smart contract implemented on a blockchain includes the initial steps of segregating the smart contract into an updateable smart contract and a non-updateable smart contract, where the non-updateable smart contract handles persistent data storage and retrieval to the blockchain for data that needs to be permanently accessible and the updateable smart contract does not contain data storage and retrieval to the blockchain, deploying the non-updateable smart contract and a first version of the updateable smart contract; calling an interface of the non-updateable smart contract with an address of the first version of the updateable smart contract; and the non-updateable smart contract storing the address of the first version of the updateable smart contract to the blockchain. To update the smart contract, a second version of the updateable smart contract is deployed and the interface of the non-updateable smart contract is called with an address of the second version of the updateable smart contract, which the non-updateable smart contract stores to the blockchain. The non-updateable smart contract invokes the second version of the updateable smart contract by retrieving the address of the second version of the updateable smart contract from the blockchain and calls the second version of the updateable smart contract at the retrieved address.

In other embodiments, the smart contract is segregated into the non-updateable smart contract and a plurality of the updateable smart contracts that have respective interfaces with the non-updateable smart contract. The calling steps call the respective interfaces with addresses of the respective versions of the respective updateable smart contracts, and the addresses of the respective versions of the respective updateable smart contracts are stored to the blockchain. The invoking step includes retrieving the addresses of the second versions of the updateable smart contracts from the blockchain and calling the second versions of the updateable smart contracts at the retrieved addresses. Alternatively, the respective interfaces may be replaced by a single interface where the calling steps include calling the single interface with an identifier associated with and the respective addresses of the respective updateable smart contracts. In this embodiment, the storing steps store the identifiers and addresses of the respective versions of the respective updateable smart contracts to the blockchain, and the invoking step includes retrieving the identifiers and addresses of the second versions of the updateable smart contracts from the blockchain and calling the second versions of the updateable smart contracts identified by the identifier at the retrieved addresses.

In still other embodiments, the updateable smart contract is self-registering and the calling steps include the self-registering updateable smart contract calling the interface of the non-updateable smart contract with the address of the respective versions of the self-registering updateable smart contract. Multiple updateable smart contracts may be self-registering as well. In such embodiments, the segregating includes segregating the smart contract into the non-updateable smart contract and a plurality of the updateable smart contracts, and the deploying steps include deploying first and second versions of each updateable smart contract. The calling step includes the self-registering updateable smart contracts calling respective interfaces of the non-updateable smart contract with the addresses of the respective versions of the respective self-registering updateable smart contracts. Also, the storing step includes storing the addresses of the respective versions of the respective updateable smart contracts to the blockchain, and the invoking step includes retrieving the addresses of the second versions of the updateable smart contracts from the blockchain and calling the second versions of the updateable smart contracts at the retrieved addresses.

In each of these embodiments, the segregating may also include segregating the smart contract into a plurality of non-updateable smart contracts.

In still other embodiments, the updateable smart contract is hard-coded with the address of the non-updateable smart contract. In this embodiment, the smart contract implemented on a blockchain is updated by segregating the smart contract into an updateable smart contract and a non-updateable smart contract, where the non-updateable smart contract handles persistent data storage and retrieval to the blockchain for data that needs to be permanently accessible and the updateable smart contract does not contain storage and retrieval to the blockchain. The non-updateable smart contract is deployed, and an address of the non-updateable smart contract is hard-coded into a first version of the updateable smart contract which is then deployed. To update the updateable smart contract, a second version of the updateable smart contract is deployed and the second version of the updateable smart contract is called. The second version of the updateable smart contract calls the non-updateable smart contract at the hard-coded address, and the non-updateable smart contract stores any permanent data to the blockchain.

The embodiments described herein also encompass computer systems and computer readable media coded with instructions for implementing the methods described throughout this disclosure.

BRIEF DESCRIPTION OF THE DRAWINGS

The present disclosure is illustrated by way of example and not limitation in the figures of the accompanying drawings, in which like references indicate similar elements and in which:

FIG. 1A illustrates a first step in which a Parent Contract is deployed.

FIG. 1B illustrates the deployment of a Child Contract with add functionality.

FIG. 1C illustrates the deployment of another Child Contract with multiply functionality.

FIG. 1D illustrates the connection of the Parent Contract with both the Add Child Contract and the Multiply Child Contract.

FIG. 1E illustrates replacement of the add function with the subtract function including deployment of a Subtract Child. Contract.

FIG. 1F illustrates the connection between the Add Child Contract and the Parent Contract being removed and a connection with the Subtract Child Contract being added.

DETAILED DESCRIPTION

Figure 1A:
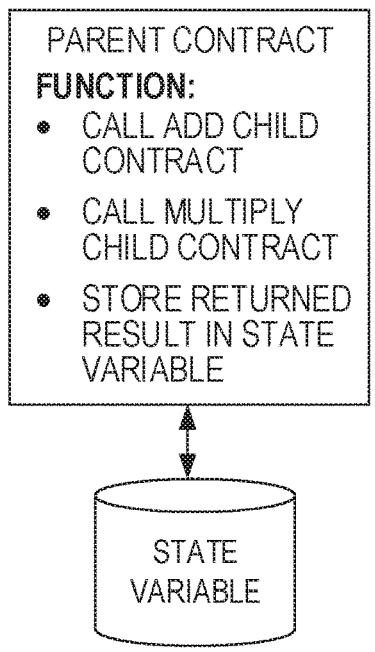
FIGS. 1A-1F illustrate a parent/child smart contract embodiment of a calculator in accordance with some embodiments.

The following description with respect to FIGS. 1-7 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

TERMINOLOGY

Blockchain: A continuously growing list of records, called blocks, that are linked and secured using cryptograph. Each block typically contains a cryptographic hash of the previous block, a timestamp, and transaction data. The blockchain is designed to be inherently resistant to modification of the transaction data. For use as a distributed ledger, a blockchain is typically managed by a peer-to-peer network that collectively adheres to a protocol far validating new blocks. Once recorded, the data in any given block cannot be altered retroactively without the alteration of all subsequent blocks, which requires collusion of the network majority.

Smart Contract: A computer protocol that provides the general-purpose computation that takes place on the blockchain or distributed ledger. The smart contract transactions may be simple or may implement sophisticated logic. The resulting transactions are typically public, trackable and irreversible. Various cryptocurrencies and smart contract platforms such as Ethereum have implemented types of smart contracts. In the case of Ethereum, smart contracts are high-level programming abstractions that are compiled down to bytecode and deployed to the Ethereum blockchain for execution.

Ethereum: An open-source, public, blockchain-based distributed computing platform and operating system featuring smart contract (scripting) functionality. Ethereum provides a decentralized Turing-complete virtual machine, the Ethereum Virtual Machine (EVM), that is the runtime environment for smart contracts for executing scripts using an international network of public nodes. Ethereum is a prominent and well-known smart contract framework.

Ethereum Constructor: In Ethereum, a Constructor is a routine which is part of a Smart Contract that is automatically executed by the blockchain platform at the time the Smart Contract is deployed to the blockchain network. Other blockchain platforms include similar mechanisms or such mechanisms are achievable.

Contract: A Smart Contract.

Client (Parent) Contract*: The portion of a segregated Contract that handles all persistent data storage and retrieval to the blockchain that needs to be permanently accessible. The Client Contract is designed to never be updated. In sample embodiments, the Client Contract may retrieve permanent data and pass it to a Service Contract, and the Service Contract may compute and return data back to the Client Contract for permanent storage.

Service (Child) Contract*: The portion of a segregated Contract that is invoked by the Client Contract and does not contain storage and retrieval. The Service Contract may be updated at any time via one of several mechanisms described herein.

*In some embodiments described below, the role of the Client Contract and Service Contract is reversed whereby the Service Contract provides permanent storage and retrieval and the Client Contract is updateable.

OVERVIEW

The systems and methods described herein partially addresses a unique problem that was created by the introduction of programmable distributed ledger platforms like Ethereum. These platforms tightly couple their user-contributed distributed programs ("Contracts") with any data persistently stored by each program into the distributed ledger after the program itself has been deployed to the distributed ledger network. The effect of this coupling is that any attempt in prior art systems to replace a Contract with an updated version rendered all data stored by the previous version unreadable to the updated Contract. Those skilled in the art will appreciate that this excludes extraordinary measures, such as a fork to the distributed ledger network programming, which would be outside of the normal day-to-day operation of the network. The techniques described herein apply to any such distributed ledger platform.

In prior art systems, the inability to update a Contract was simply accepted and Contracts were deployed with the expectation that no part of them could be updated without loss of access to persistent data. The systems and methods described herein address this limitation by segregating a proposed smart contract into (1) a Client Contract which handles all persistent data storage and retrieval to the blockchain for all data that needs to be permanently accessible and (2) one or more Service Contracts that are invoked by the Client Contract and do not contain such storage and retrieval. The Client Contract is designed to never be updated, but the Service Contract(s) may be updated at any time via one of several mechanisms described herein. In sample embodiments, the Client Contract may retrieve permanent data and pass it to a Service Contract, and the Service Contract may compute and return data back to the Client Contract for permanent storage.

Before describing the systems and methods in detail, a simple example of a calculator will first be discussed in order to better explain parent/child (Client Contract/Service Contract) architecture of the sample embodiments.

Calculator Example

Assume one wanted to build a calculator with the following functionality on day one:
  Add two numbers
  Multiply two numbers
  Store the results of all operations and never lose the data.
In order to build a calculator with the above functionality, a parent contract with the following features is deployed:
  Call any child contract which can take two numbers and return one number
  Ability to store contract address
  Ability to store return result in state variable Once a parent contract with the above functionality is deployed, then one will need to deploy two child contracts, one with the add function and one with the multiply function. Both these functions will take in two numbers and will return the result and will not store anything in the state variable. Once a child contract is deployed, the address of these two contracts will be updated to the parent contract. Now the parent contract can call these two contracts and can store the results. The combination of the parent and child contracts together fulfill the requirement of building a calculator.

Now, assume that after some time the user of the calculator decides that he does not want add functionality but wants subtraction functionality. It is to remain a requirement that no data should be lost. In this case, if a new parent and child contract is deployed, then all the data stored by the old parent contract will be lost, which is undesirable. However, under the parent and child model, another child contract similar to the add child contract may be deployed which will do subtraction. Once the subtract child contract is deployed, the parent contract is updated with the address of this new subtract child contract. In this fashion, the functionality of the calculator smart contract may be updated while the stored data remains immutable. FIGS. 1A-1F illustrate this calculator example diagrammatically.

FIG. 1A illustrates a first step in which a Parent Contract is deployed with specified functionality including:
  Call Add Child Contract
  Call Multiply Child Contract
  Store returned result in state variable The Parent Contract will contain the state variables and only business logic will be present in the Child Contract. During the design phase, the Parent Contract is required to identify all the state variables that will be used in the present and that can be used in the future.

Figure 1B:
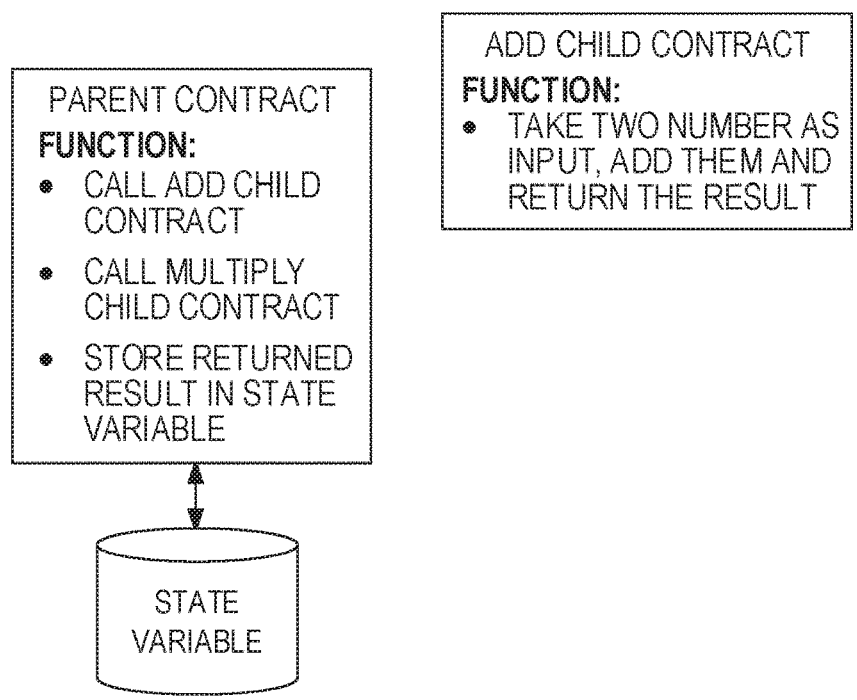

FIG. 1B illustrates the deployment of a Child Contract with add functionality. In particular, the Add Child Contract includes the function of taking two numbers as input, adding them, and returning the result.

Figure 1C:
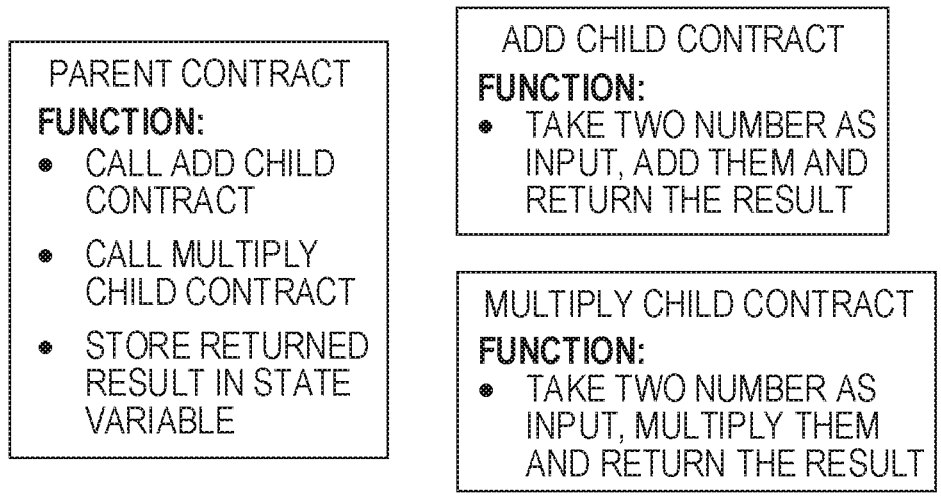

FIG. 1C illustrates the deployment of another Child Contract with multiply functionality. In particular, the Multiply Child Contract includes the function of taking two numbers as input, multiplying them, and returning the result.

Figure 1D:
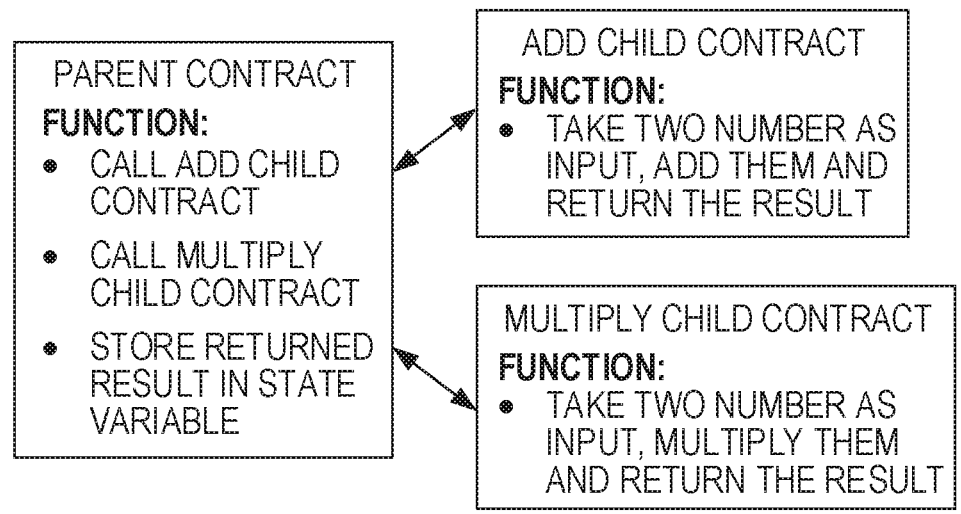

FIG. 1D illustrates the connection of the Parent Contract with both the Add Child Contract and the Multiply Child Contract.

Figure 1E:
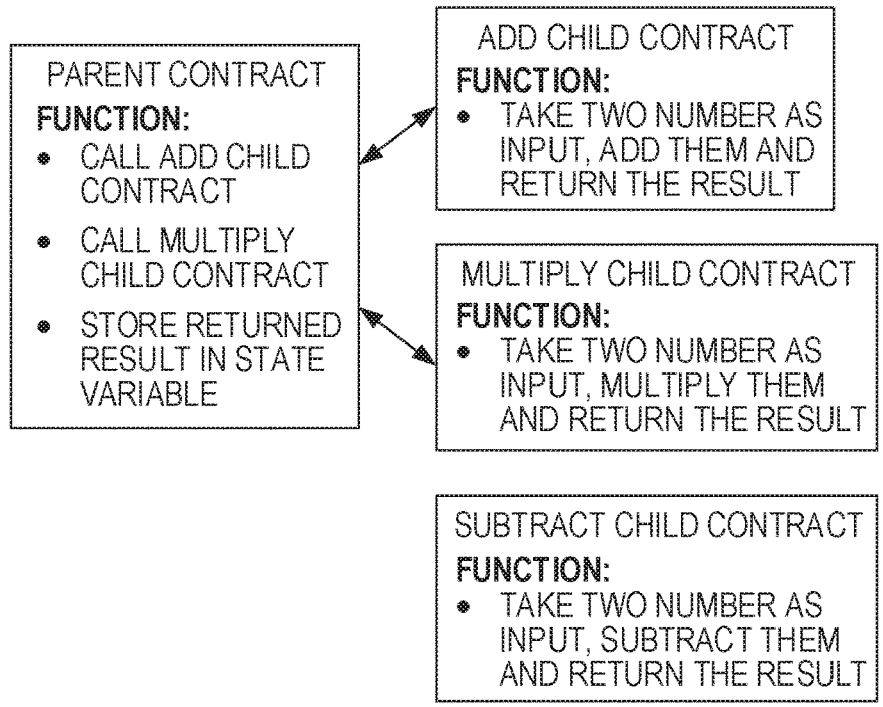
Figure 1F:
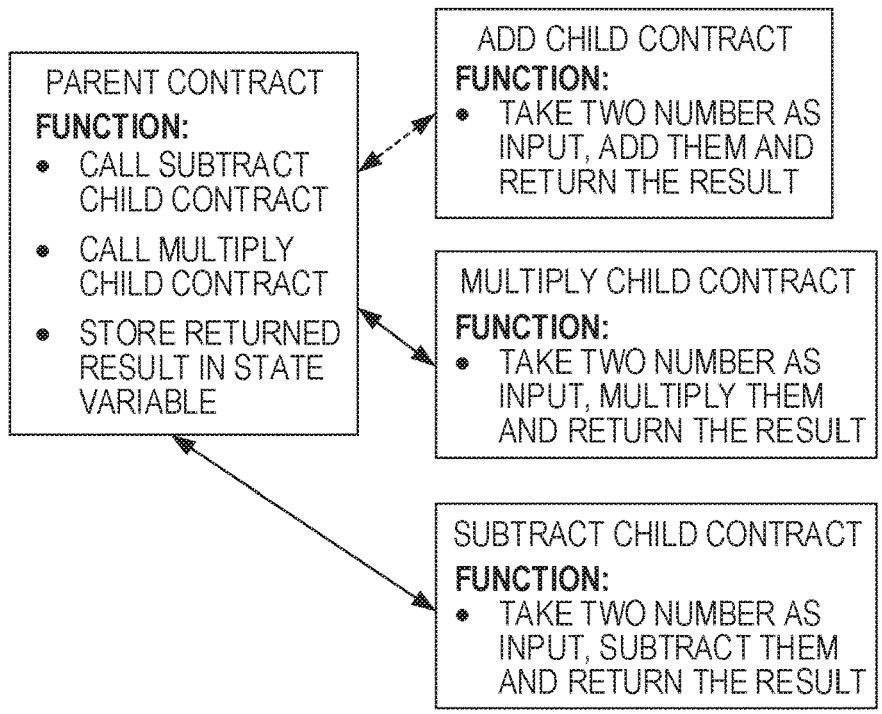

Now, in order to remove the add function and to replace it with the subtract function, a Subtract Child Contract is deployed as shown in FIG. 1E. The Subtract Child Contract includes the function of taking two numbers as input, subtracting them, and returning the result. Next, the connection between the Add Child Contract and the Parent contract is removed and a connection with the Subtract Child Contract is added as shown in FIG. 1F. As required, the connection to the Add Child Contract can be added back again at any time. Also, if the Parent Contract was designed to permit updateability as described herein, then the Subtract Child Contract can be added to provide additional functionality in addition to the Add Child Contract and the Multiply Child Contract. It will be appreciated that each Child Contract has the same number of inputs and outputs and addresses that are provided to the Parent Contract.

Detailed Description—Client Contract with One Updateable Service Contract

In sample embodiments described herein, a Client Contract, one updateable Service Contract, and a mechanism for an external caller to configure the Client Contract with the address of the Service Contract each time a new version of the Service Contract is deployed is provided.

Figure 2A:
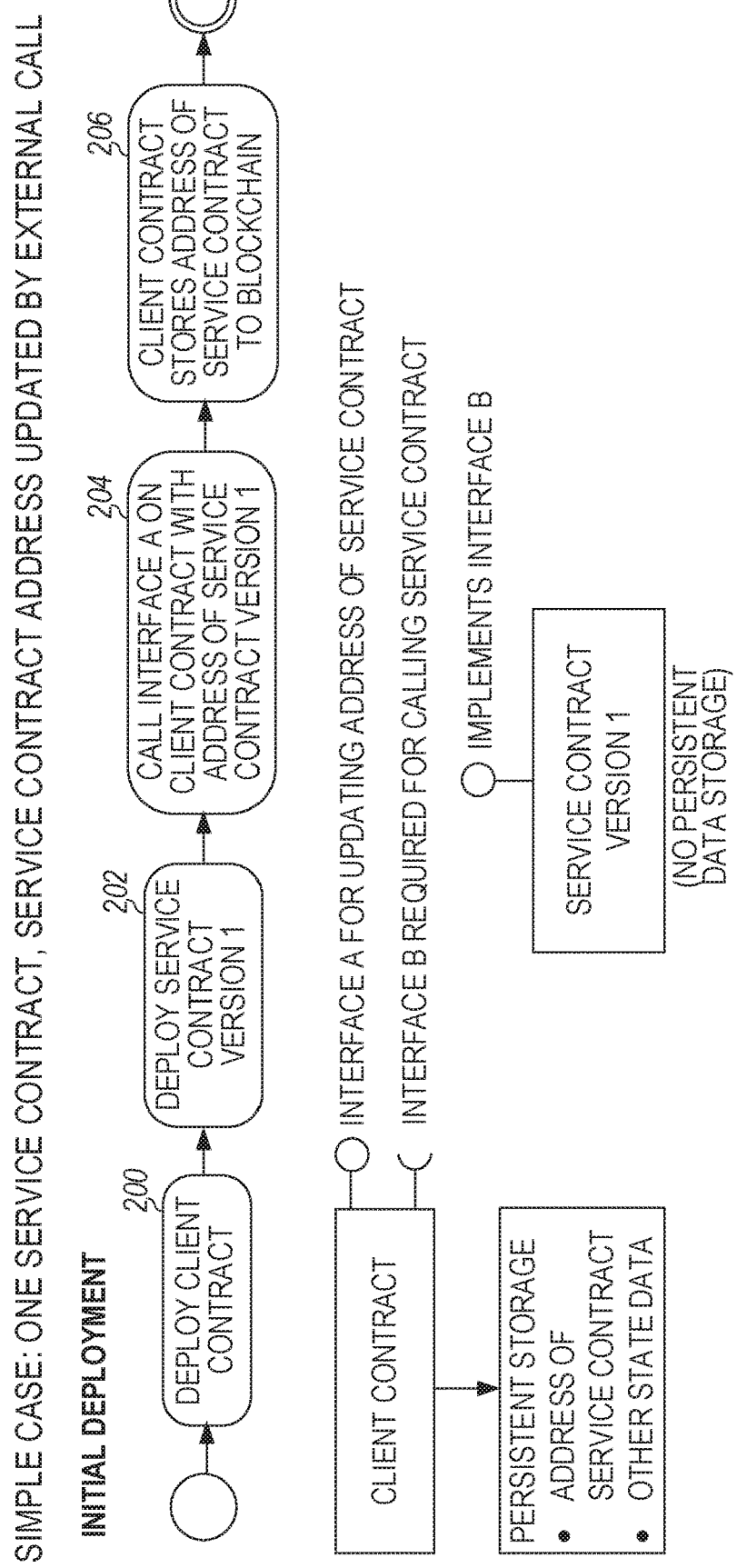
FIG. 2A illustrates a simple case including one Service Contract where the Service Contract is updated by an external call in accordance with some embodiments.

FIG. 2A illustrates a simple case including one Service Contract where the Service Contract is updated by an external call. As illustrated, the initial deployment includes deploying the Client Contract at 200, deploying Version 1 of the Service Contract at 202, and calling interface A on the Client Contract with the address of Version 1 of the Service Contract at 204. The Client Contract stores the address of Version 1 of the Service Contract to the blockchain at 206. As illustrated, the Client Contract includes Interface A for updating the address of the Service Contract and Interface B for calling the Service Contract as well as persistent storage for storing the address of the Service Contract as well as other state data. Version 1 of the Service Contract has no persistent storage and is implemented via Interface B on the Client Contract.

Figure 2B:
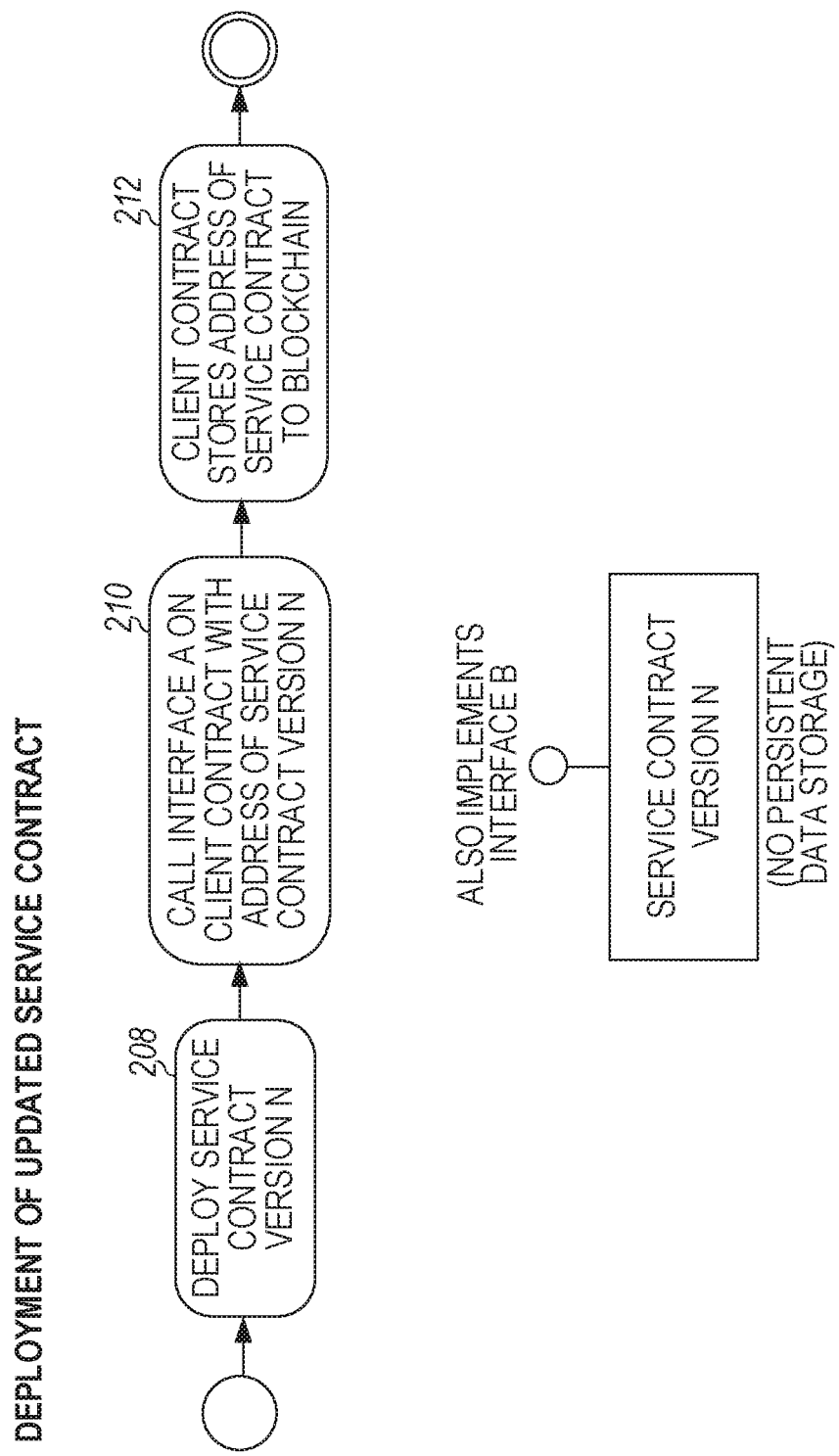
FIG. 2B illustrates the deployment of an updated Service Contract with respect to the initial deployment shown in FIG. 2A in accordance with some embodiments.

FIG. 2B illustrates the deployment of an updated Service Contract with respect to the initial deployment shown in FIG. 2A. As illustrated, Version N of the Service Contract is deployed at 208 and Interface A on the Client Contract is called with the address of Version N of the Service Contract at 210. The Client Contract stores the address of Version N of the Service Contract to the blockchain at 212. Version N of the Service Contract also has no persistent storage and is implemented via Interface B on the Client Contract.

Figure 2C:
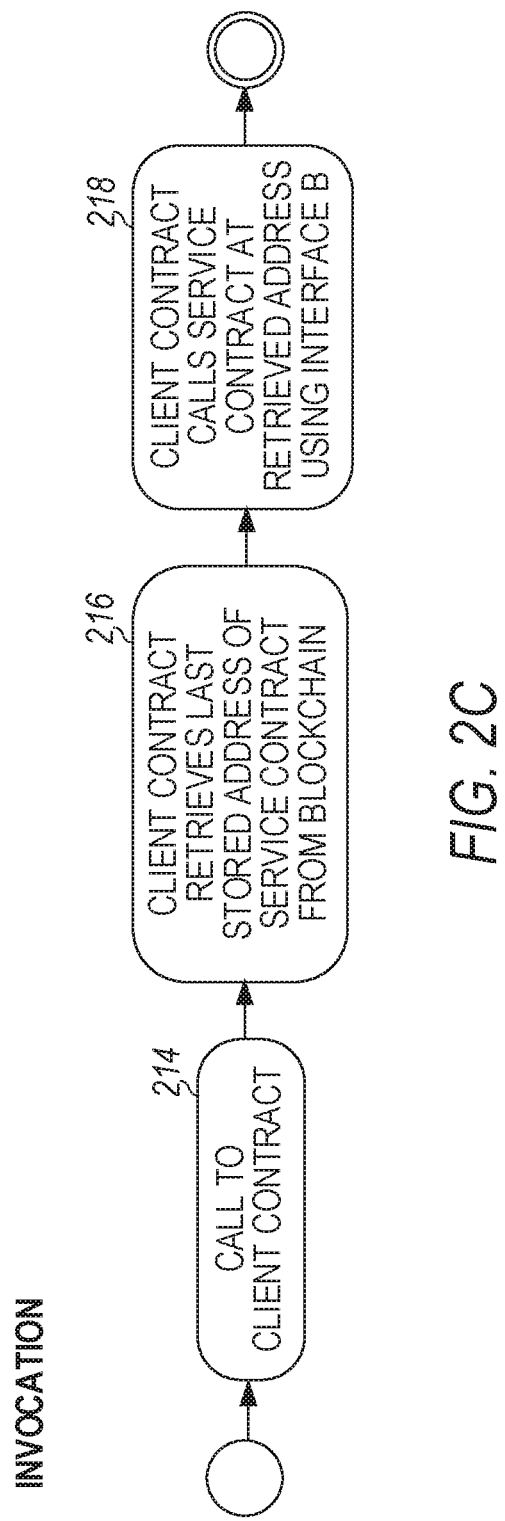
FIG. 2C illustrates invocation of the updated Service Contract shown in FIG. 2B in accordance with some embodiments.

FIG. 2C illustrates invocation of the updated Service Contract. As illustrated, a call is made to the Client Contract at 214, and the Client Contract retrieves the last stored address of the Service Contract from the blockchain at 216. Then, at 218, the Client Contract calls the latest version of the Service Contract at the retrieved address using Interface B.

Sample Code for implementing the Client Contract with one updateable Service Contract as described with respect to FIGS. 2A-2C is provided below. In this sample, a portion of the contract functionality that is expected to change, a tax calculation that changes from 10% to 13%, has been placed into a separate Service Contract, which is called by the Client Contract which handles all permanent storage to the Distributed Ledger. The Client Contract is implemented as follows:

Client Contract

```
pragma solidity ^0.4.18;
// Note import of version 1 will work fine for
// updated service contracts with same interface
import "./ServiceContractVersion1.sol";
contract ClientContract {
struct SampleData {
    bytes32 Name;
    uint256 Amount;
    uint256 Tax;
}
address public ServiceContractAddress;
// Client contract stores instances of SampleData structure
// in a map, keyed with an integer.
mapping(uint256 => SampleData) publicSampleDataMap;
// Represents "Interface A" for updating Client with the address
// of the Service Contract
function linkToServiceContract (address _newServiceContractAddress)
        public {
    ServiceContractAddress = _newServiceContractAddress;
}
// Main function called by external accounts
function insertSampleData(uint256 _id, bytes23 _name, uint2.56 _amount)
        public {
    uint256 calculatedTax;
    // Call the Service Contract in order to get the
    // current tax calculation
    // (corresponds to calling "Interface B" shown in diagram)
    ServiceContract objServiceContract=
        ServiceContract(ServiceContractAddress);
    calculatedTax = objServiceContract.calculateTax(_amount);
    SampleDataMap[_id] = SampleData(
        {Name:_name, Amount:_amount, Tax:calculatedTax});
}
```

Version 1 of the Service Contract is implemented as follows:

Service Contract, Version 1

```
pragma solidity ^0.4.18;
contract ServiceContract {
    // The signature of this function represents "Interface B" in diagram
    function calculateTax(uint256 _amount) public pure returns (uint256
    Tax)
    {
        //initial tax calculation is 10 percent
        return(_amount * 110);
    }
}
```

Version 2 of the Service Contract is implemented as follows:

Service Contract, Version 2

```
pragma solidity ^0.4.18;
contract ServiceContract {
    // The signature of this function also represents "Interface B" in diagram
    // and must be identical to the signature in service contract version 1.
    function calculateTax(uint256 _amount) public pure returns (uint256
    Tax)
    {
        // version 2 tax calculation is 13 percent
        return(_amount * 113);
    }
}
```

Variations

A first variation of the above embodiment involves multiple separately updateable Service Contracts, each with its own interface for invocation as well as a separate mechanism for an external caller to configure the Client Contract with the address of that particular Service Contract each time a new version of that Service Contract is deployed.

Figure 3A:
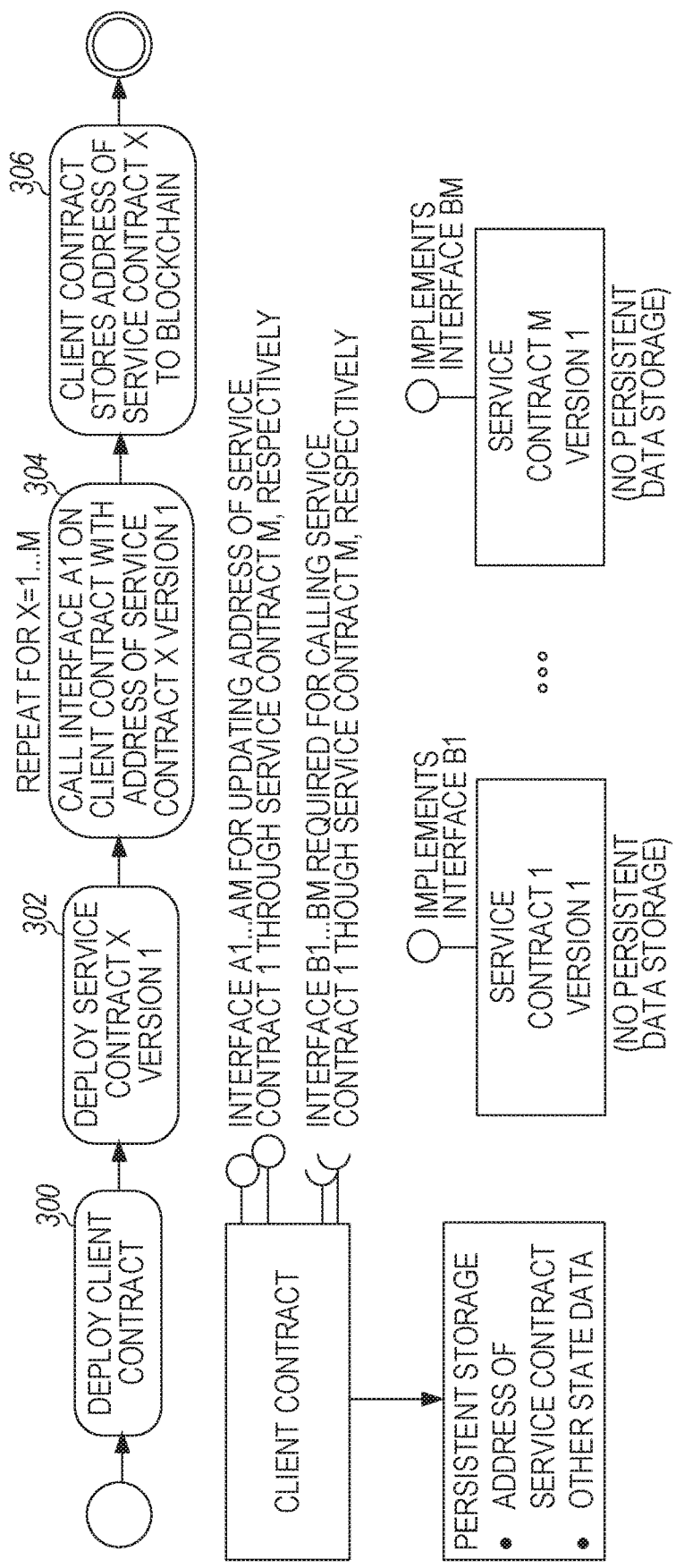
FIG. 3A illustrates an initial deployment of an embodiment of multiple Service Contracts having addresses updated by an external call in accordance with some embodiments.

FIG. 3A illustrates an initial deployment of an embodiment of multiple Service Contracts having addresses updated by an external call. As illustrated in FIG. 3A, the Client Contract is deployed at 300 and Version 1 of Service Contract X (X=1 . . . m) is deployed at 302. The Interface $A_i$ on the Client Contract is called at 304 with the address of Version 1 of the Service Contract, and the process of deployment of each Service Contract at 302 and calling the Interface $A_i$ is repeated for X=1 . . . m at Interfaces $A_1$ . . . $A_m$, respectively. The Client Contract stores the address of Version 1 of each respective Service Contract to the blockchain at 306 Version 1 of each Service Contract 1 . . . M has no persistent storage and is implemented via respective Interfaces $B_1$ . . . $B_m$ on the Client Contract.

Figure 3B:
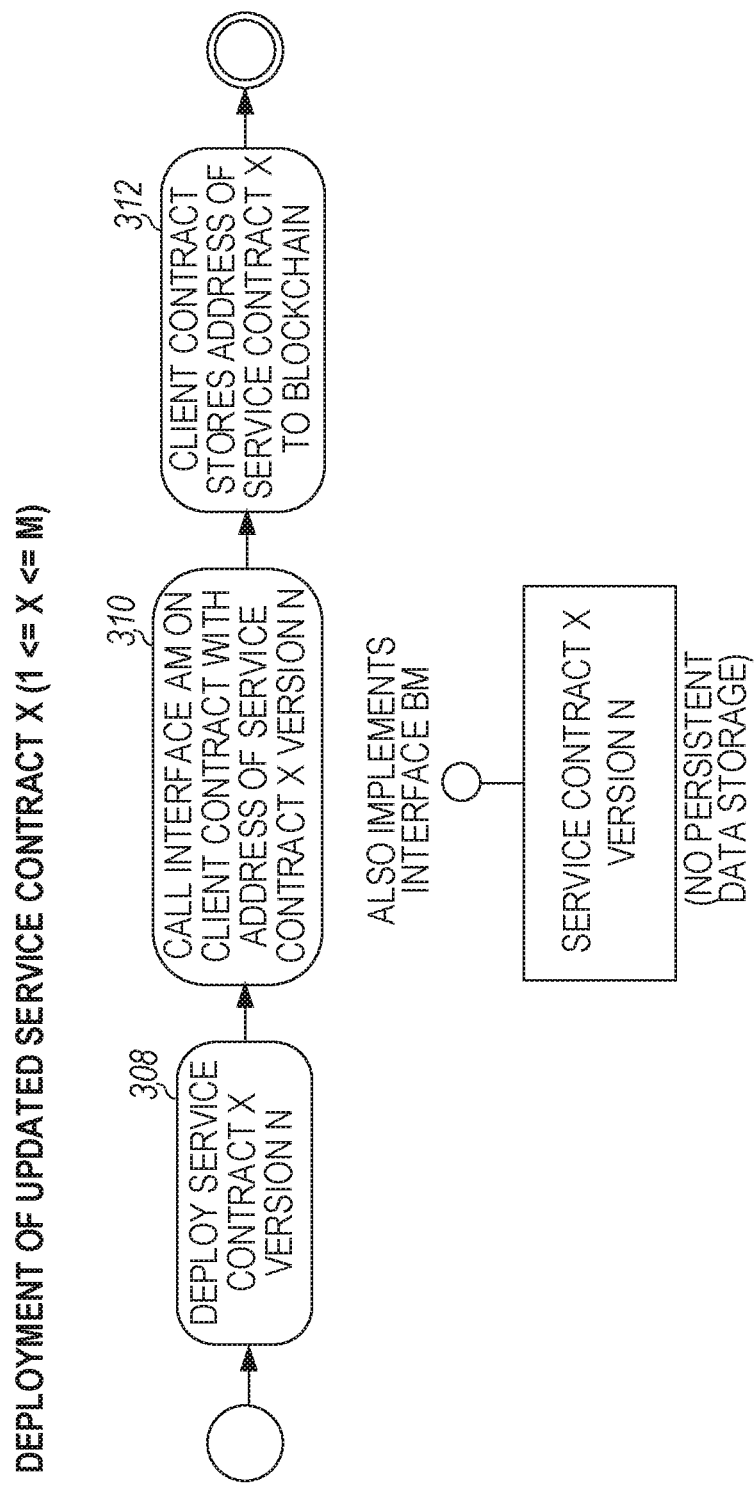
FIG. 3B illustrates the deployment of updated Service Contract X ($1 \leq X \leq M$) with respect to the initial deployment shown in FIG. 3A in accordance with some embodiments.

FIG. 3B illustrates the deployment of updated Service Contract X (1≤X≤M) with respect to the initial deployment shown in FIG. 3A. As illustrated, Version N of Service Contract X is deployed at 308 and Interface $A_m$ on the Client Contract is called with the address of Version N of Service Contract X at 310. The Client Contract stores the address of Version N of Service Contract X to the blockchain at 312. Version N of the Service Contract X also has no persistent storage and is implemented via interface $B_m$ on the Client Contract.

Figure 3C:
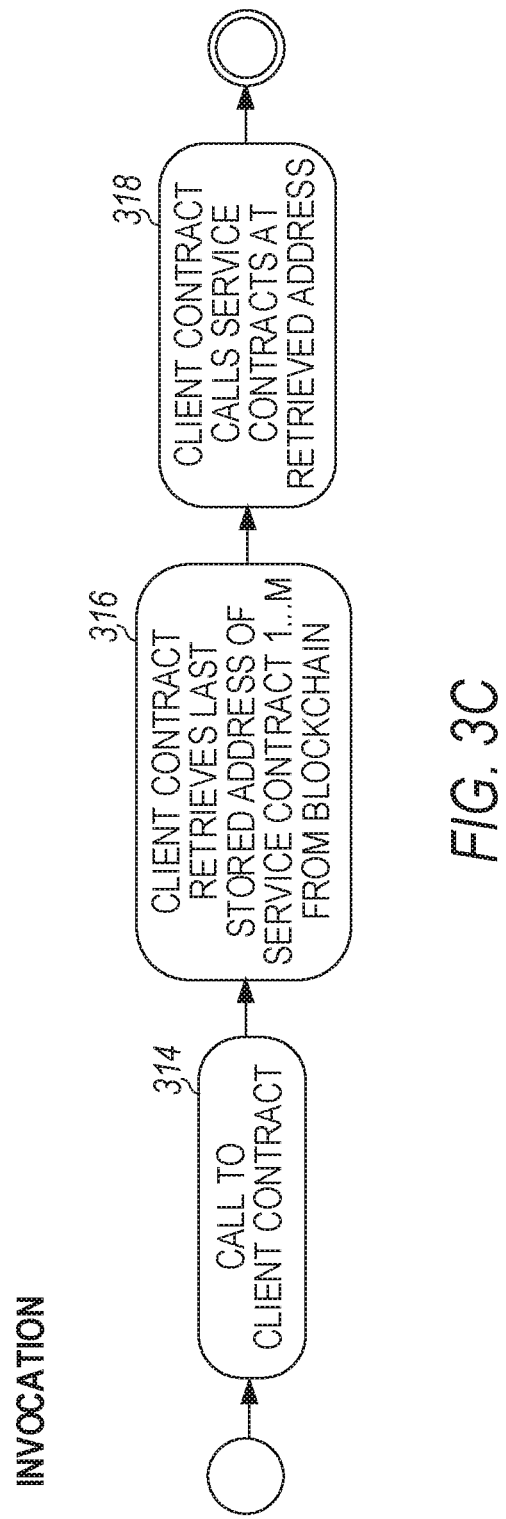
FIG. 3C illustrates invocation of the updated Service Contract X shown in FIG. 3B in accordance with some embodiments.

FIG. 3C illustrates invocation of the updated Service Contract X. As illustrated, a call is made to the Client Contract at 314, and the Client Contract retrieves the last stored address of the Service Contract 1 . . . M from the blockchain at 316. Then, at 318, the Client Contract calls the latest version of the Service Contract X at the retrieved address using Interface $B_m$.

Modifications of the above code to implement such an embodiment will be apparent to those skilled in the art.

Another variation of the above embodiments involves one Service Contract, which additionally has a mechanism for each new version of that Service Contract to automatically configure the Client Contract with its own address upon deployment.

Figure 4A:
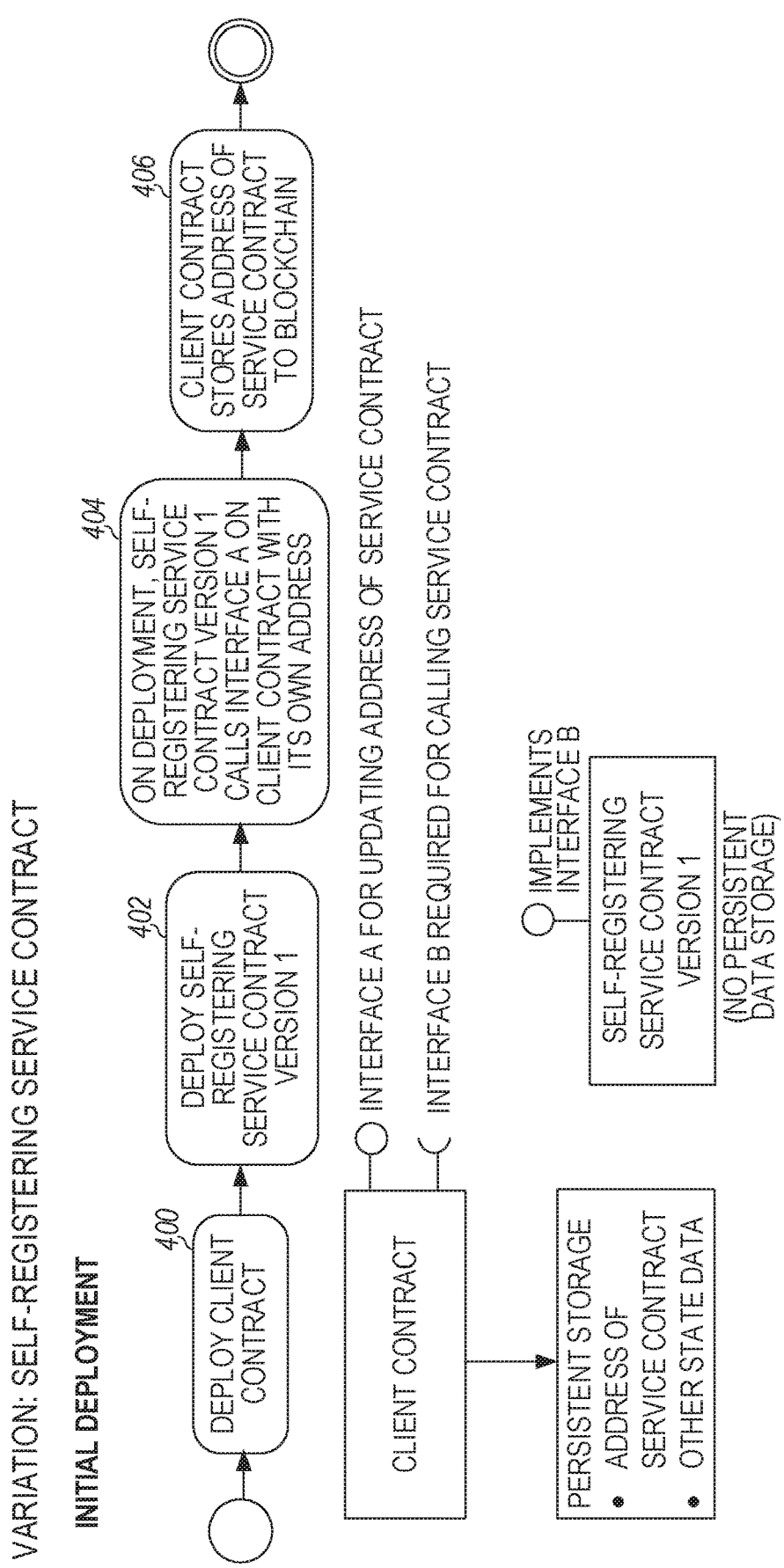
FIG. 4A illustrates an initial deployment of an embodiment of a self-registering Service Contract in accordance with some embodiments.

FIG. 4A illustrates an initial deployment of an embodiment of a self-registering Service Contract. As illustrated in FIG. 4A, the Client Contract is deployed at 400 and Version 1 of a self-registering Service Contract is deployed at 402. Upon deployment, the self-registering Service Contract Version 1 calls Interface A on the Client Contract at 404 with its own address. At 406 the Client Contract stores the address of the self-registering Service Contract Version 1 to the blockchain. Version 1 of the self-registering Service Contract Version 1 has no persistent storage and is called by Interface B on the Client Contract.

Figure 4B:
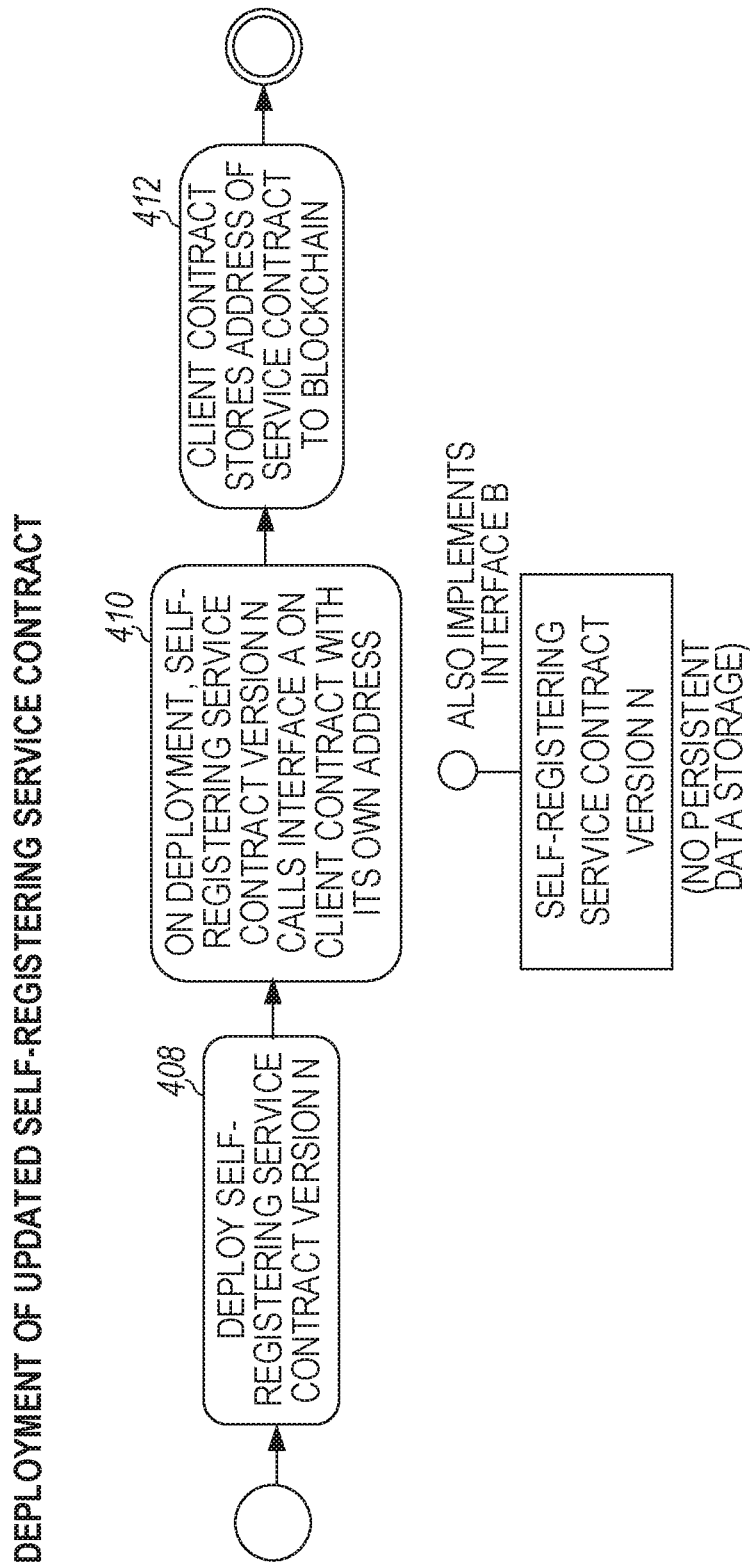
FIG. 4B illustrates the deployment of an updated self-registering Service Contract with respect to the initial deployment shown in FIG. 4A in accordance with some embodiments.

FIG. 4B illustrates the deployment of an updated self-registering Service Contract with respect to the initial deployment shown in FIG. 4A. As illustrated, Version N of the self-registering Service Contract is deployed at 408. Upon deployment, Version N of the self-registering Service Contract calls Interface A on the Client Contract with its own address at 410. The Client Contract stores the address of Version N of the self-registering Service Contract to the blockchain at 412. Version N of the self-registering Service Contract also has no persistent storage and is implemented via Interface B on the Client Contract.

Figure 4C:
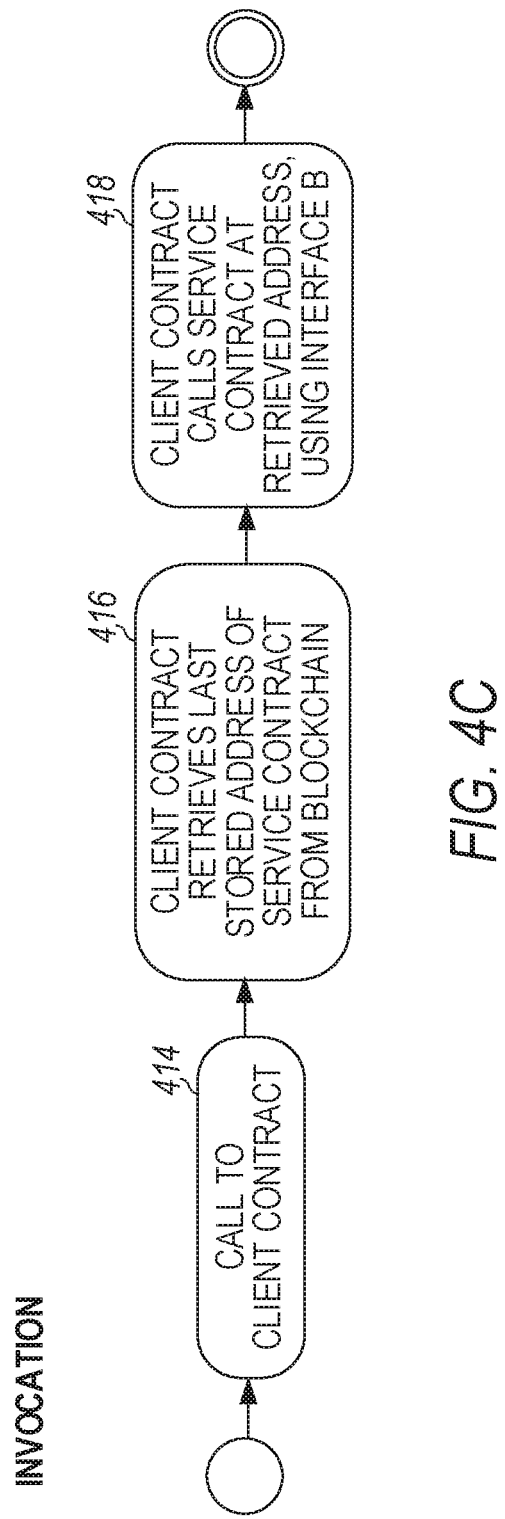
FIG. 4C illustrates invocation of the updated self-registering Service Contract shown in FIG. 4B in accordance with some embodiments.

FIG. 4C illustrates invocation of the updated self-registering Service Contract. As illustrated, a call is made to the Client Contract at 414, and the Client Contract retrieves the last stored address of the self-registering Service Contract from the blockchain at 416. Then at 418, the Client Contract calls the latest version of the self-registering Service Contract at the retrieved address using Interface B.

Modifications of the above code to implement such an embodiment will be apparent to those skilled in the art.

Another variation of the above embodiments combines multiple Service Contracts with the self-registration mechanism of the last variation.

Yet another variation of the multiple Service Contract variations of the above embodiments replaces the series of respective interfaces for updating the addresses of the Service Contracts with a single interface that accepts an identifier associated with each Service Contract along with the address of the new version of that Service Contract. The identifiers are stored with the addresses on the blockchain and are retrieved by the Client Contract in order to identify the associated Service Contract.

Yet another variation of the above embodiments segregates the Client Contract into multiple Client Contracts in order to minimize the inaccessibility of permanently recorded data in case a portion of the Client Contract must be updated.

Still another variation of the above embodiments inverts the described relationship between the contracts such that permanent persistent storage and retrieval is segregated into one or more Service Contracts, with other behaviors remaining in one or more Client Contracts. In this variation, it is the Client Contract(s) which may be updated at any time, and the Service Contracts which are not intended to be updated. In this variation, the addresses of the persistent storage Service Contracts are hard-coded in each version of the Client Contract, and no further address update mechanism is required.

Figure 5A:
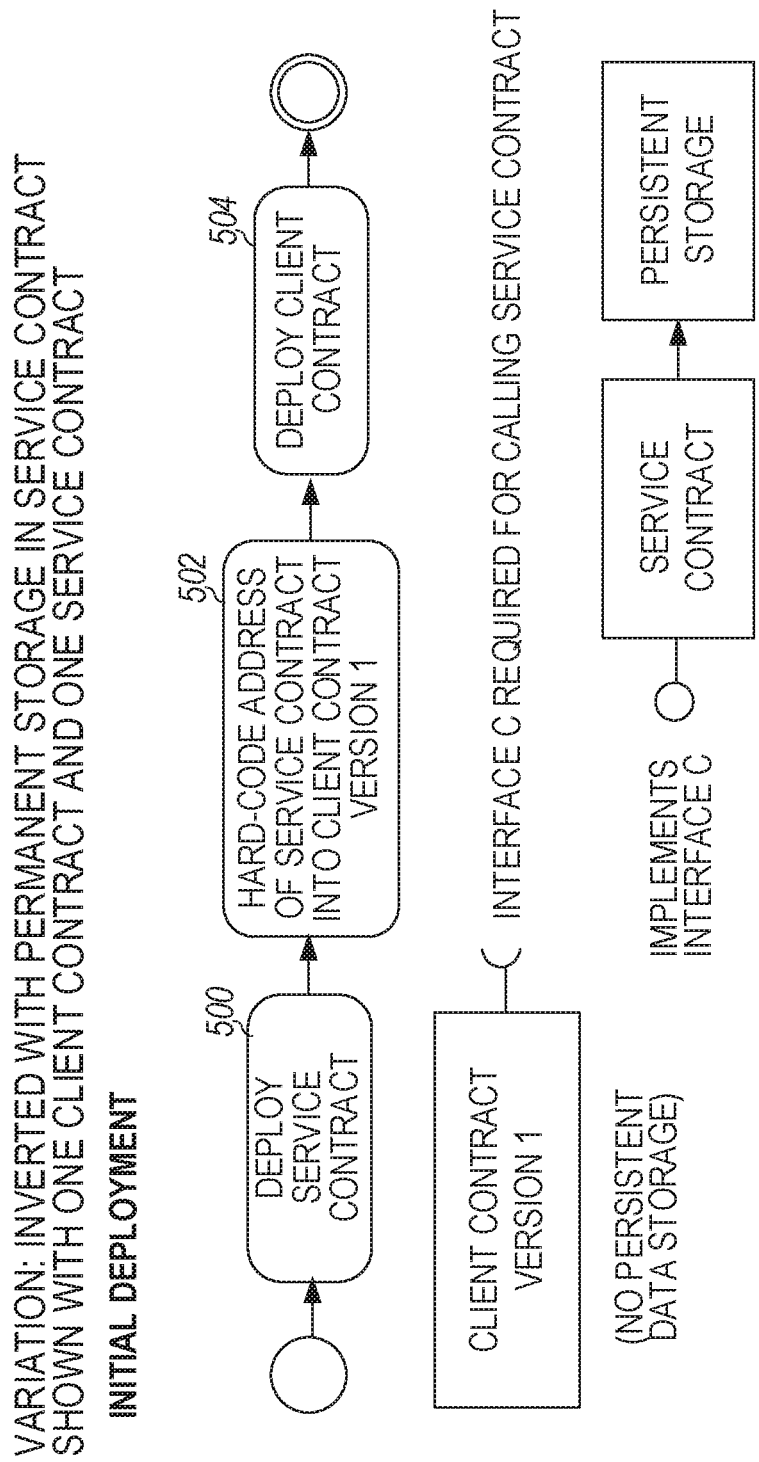
FIG. 5A illustrates an initial deployment of an embodiment where the permanent storage is provided in the Service Contract in accordance with some embodiments.

FIG. 5A illustrates an initial deployment of an embodiment where the permanent storage is provided in the Service Contract. In this embodiment, only a single Client Contract and a single Service Contract are illustrated. It will be appreciated that the approaches described above may be used to modify this embodiment to accommodate multiple Client Contracts and self-registering Client Contracts. As illustrated in FIG. 5A, the Service Contract is deployed at 500 and the address of the Service Contract is hard coded into Version 1 of the Client Contract at 502. The Client Contract is then deployed to the blockchain at 504. In this embodiment, Version 1 of the Client Contract has no persistent storage and calls the Service Contract via Interface C on the Client Contract.

Figure 5B:
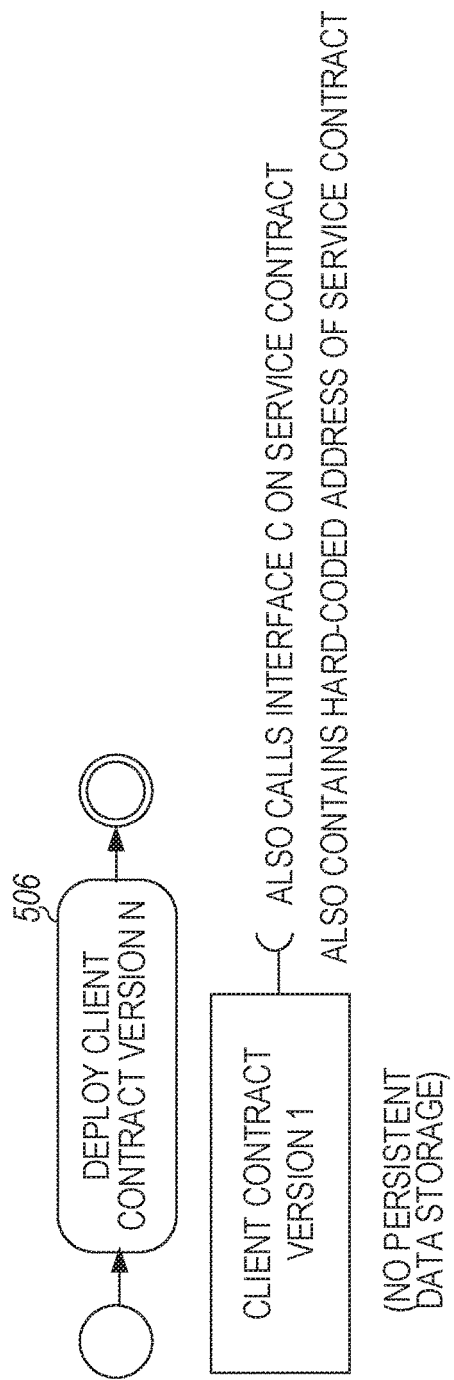
FIG. 5B illustrates the deployment of an updated Client Contract with respect to the initial deployment shown in FIG. 5A in accordance with some embodiments.

FIG. 5B illustrates the deployment of an updated Client Contract with respect to the initial deployment shown in FIG. 5A. As illustrated, Version N of the Client Contract is deployed at 506. Upon deployment, Version N of the Client Contract calls Interface C on the Service Contract using the hard-coded address of the Service Contract. Version N of the Client Contract also has no persistent storage.

Figure 5C:
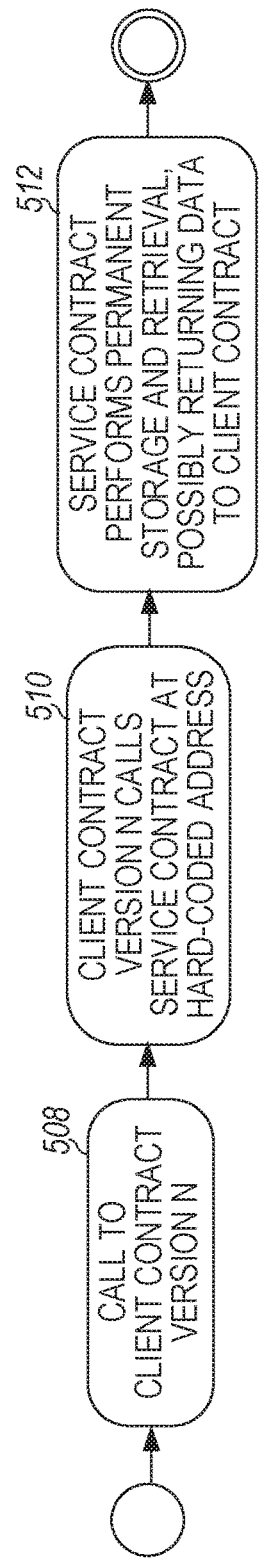
FIG. 5C illustrates invocation of the updated Client Contract of FIG. 5B in accordance with some embodiments.

FIG. 5C illustrates invocation of the updated Client Contract. As illustrated, a call is made to Version N of the Client Contract at 508, and Version N of the Client Contract calls the Service Contract at the hard-coded address at 510. Then, at 512, the Service Contract performs permanent storage and retrieval, possibly returning data to the Client Contract via Interface C.

Modifications of the above code to implement such an embodiment will be apparent to those skilled in the art.

Interfaces

The interfaces referenced in each of the embodiments described above come in two types: functional interfaces between the Client Contracts and Service Contracts (B, $B_1 \ldots B_m$, C) and the registration interfaces that are used to tell the non-updateable Client Contracts what they need to know in order to find and use an updated Service Contract once it has been deployed to the blockchain (A, $A_1 \ldots A_m$). In both cases, the term interface is used in the software sense, i.e., the logical point at which independent software entities interact. More specifically, the interface includes function signatures visible and accessible to external callers including other smart contracts. The signatures include the function name, data types expected for input, and data types that will be returned. However, the interfaces need not provide anything about the implementation—that is, nothing about what the function actually does when called.

Functional Interfaces

For any Service Contract, the interface in the above embodiments includes collectively the signatures of all of its functions that are called by the Client Contract. Because in each variation either the Client Contract or the Service Contract may not be updated, those signatures can never be changed, or the calls between them will fail. What each function actually does can be changed if the variation allows updated Service Contracts, as long as the computation can be done with the same inputs. How to build these interfaces (i.e., how to design them) is addressed below with respect to each of the variations mentioned above.

Simple case—Identify all functionality that might need updating. Plan permanent storage support in the Client Contract to support the needs of the current Service Contract plus any anticipated future needs. Write functions in Service Contract Version 1 that implement the currently needed functionality, but have signatures that would, unchanged, support the needs of any future functionality.

Multiple Service Contracts—Same as simple case, except that the Service Contract functionality is split across the multiple Service Contracts.

Self-registering simple case—same as simple case.

Self-registering, multiple Service Contracts—same as multiple Service Contracts case.

Multiple Service Contracts, single registration interface—same as multiple Service Contracts case.

Multiple Client Contracts—Same as above (this variation can apply to any of the above cases; it just splits up the Client Contract). The function calls can originate from any one of the Client Contracts, but that does not change the design of the interface.

Inverted with storage in Service Contract—Here, functions in the Service Contract provide non-updateable services which includes all permanent storage and retrieval. These Service Contract functions as much as possible are designed to support the future needs of the Client Contract as it becomes updated in the future. That applies to both the interface and the implementation of the Service Contract functions since neither can be changed after the initial deployment.

Registration Interfaces

Simple case, a basic approach to designing this interface is shown by the sample code above. The signature of function {linkToServiceContract} is Interface A in this case. That function is to be called manually each time a version of the Service Contract is deployed. Those skilled in the art will appreciate that for Ethereum, "called manually" is actually accomplished by the programmer sending a transaction to the blockchain that contains the order to call the function and includes the new service contract address as a supplied parameter.

Multiple Service Contracts—essentially the same as the simple case, except that there would be a separate {linkToServiceContract} function for each updateable Service Contract. For example, {linkToServiceContract1 (address_newServiceContract1Address)}, {linkToServiceContract2(adress_newServiceContract2Address)}, etc.

Self-registering simple case—same as simple case, except the Service Contract has a mechanism that automatically calls the registration interface (e.g., calls {linkToServiceContract}). A simple approach to that mechanism that works for Ethereum would be the addition of a "constructor" to the Service Contract. The constructor executes when the Service Contract is deployed, and it calls the registration interface. Each new version of the Service Contract would contain this constructor code. For a working example, one may simply add the following function to the Service Contract in the simple case sample code:

```
function ServiceContract(address_clientContractAddress) public{
    ClientContract objCitentContract =
ClientContract(_clientContractAddress);
    objClientContract.linkToServiceContract(this);
}
```

Those skilled in the art will appreciate that this sample requires the address of the Client Contract to be supplied by the programmer to the constructor during each deployment, but it could also be hard-coded since the Client Contract will not be changing.

Self-registering multiple Service Contracts—same as the self-registering simple case, except that each Service Contract upon deployment calls the registration interface specific to that service contract:

```
function ServiceContract1(address_clientContractAddress) public{
    ClientContract objClientContract =
ClientContract(_clientContractAddress);
    objClientContract.linkToServiceContract1(this);
}
```

Multiple Service Contracts, single registration interface—instead of having multiple registration functions in the client (e.g., {linkToServiceContract1}, {linkToServiceContract2}) just one function is used:

```
mapping(uint256 => address) public ServiceContractAddressMap;
function linkToServiceContract (uint256 _serviceContractIndex,
    address_newServiceContractAddress)
    public {
    ServiceContractAddressMap[_interfaceIndex] =
    _newServiceContractAddress;
}
```

In this case, the programmer would send a transaction to call that function each time one of the Service Contracts had a new version deployed. Using the example code, if Service Contract 2 was deployed with a new version, the programmer would issue a transaction that would call:

linkToServiceContract(2,<address of new version of Service Contract 2>)

Multiple Client Contracts—This variation could apply to any of the above embodiments. The registration interface must be repeated in every one of the Client Contracts resulting from the split. Every one of those interfaces must be called upon the deployment of a Service Contract version. The method of invoking it is the same as that used by whichever of the above variations was used as a starting.

Inverted with storage in Service Contract—This variation does not use a registration interface.

Figure 6A:
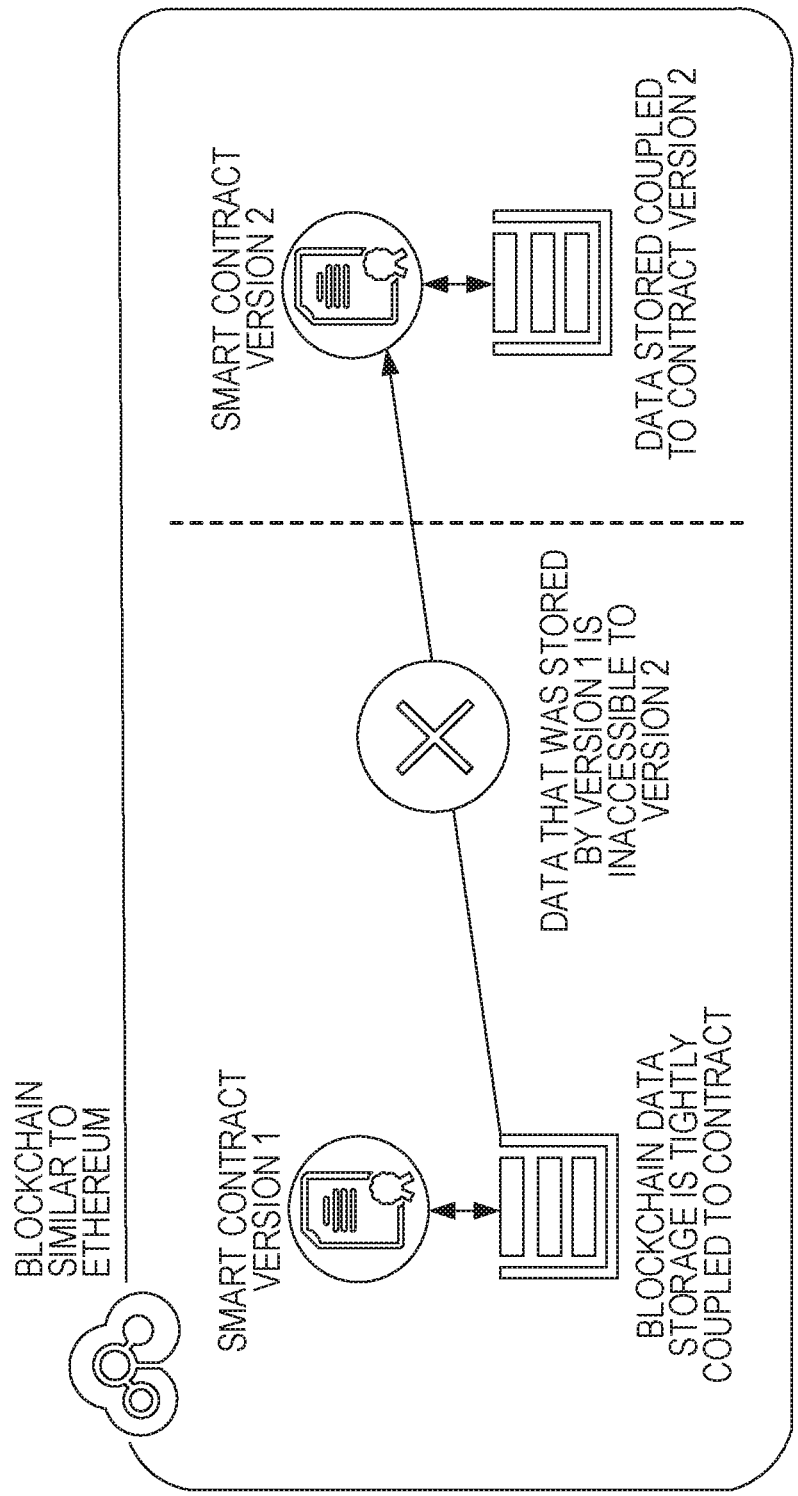
FIG. 6A illustrates a conventional smart contract where Versions 1 and 2 of the smart contract are stored on the blockchain and the blockchain data storage is tightly coupled to the respective versions of the contract.
Figure 6B:
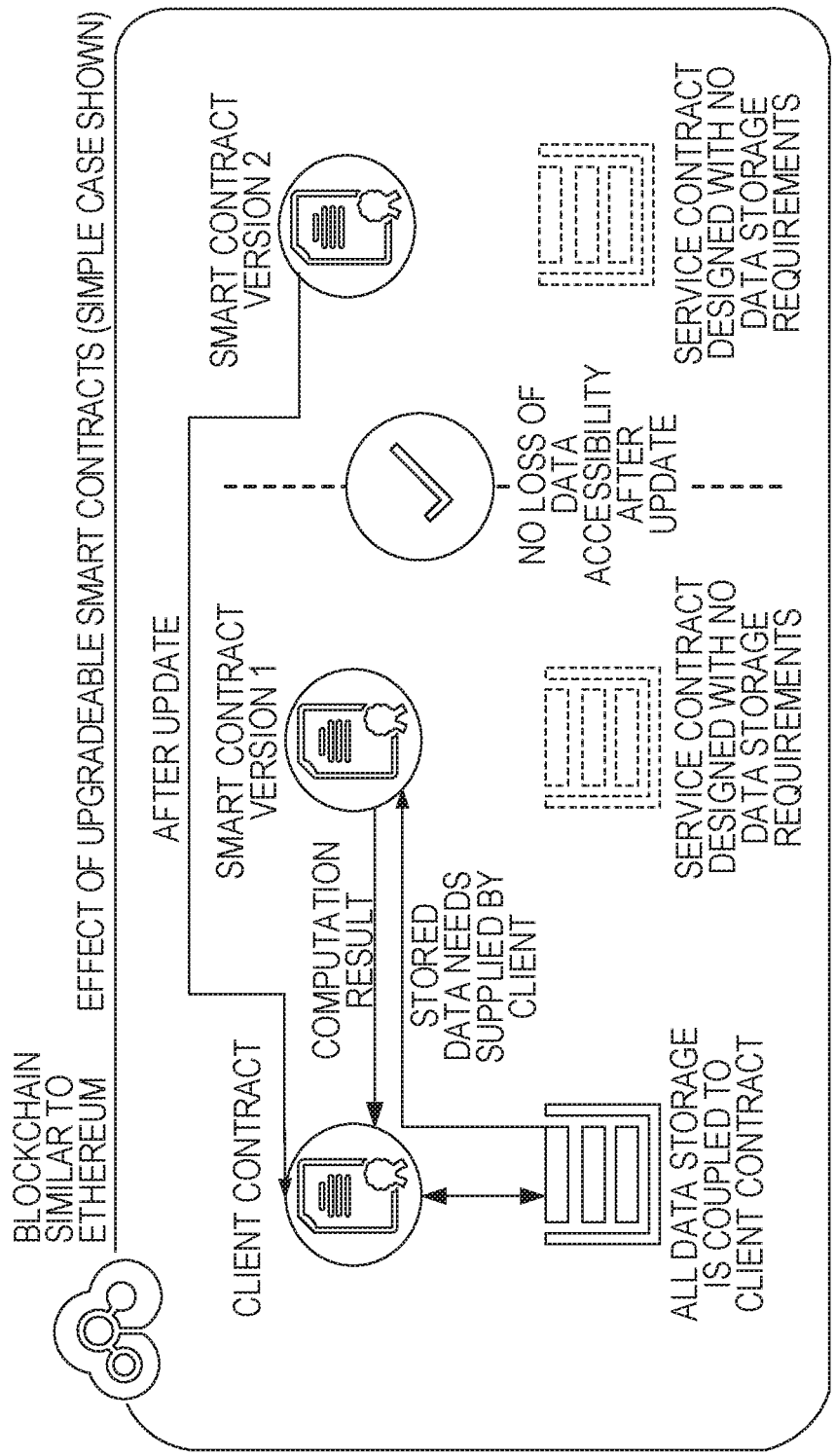
FIG. 6B illustrates updateable smart contracts where all data storage is coupled to the Client Contract and respective Service Contracts with no data storage requirements provide updated computation results to the Client Contract via an interface in accordance with some embodiments.

FIG. 6 compares the updateable smart contracts described herein with conventional smart contracts. FIG. 6A illustrates a conventional smart contract where Versions 1 and 2 of the smart contract are stored on the blockchain and the blockchain data storage is tightly coupled to the respective versions of the contract. In this conventional scenario, the data that was stored by Version 1 is inaccessible to Version 2, and vice-versa. By contrast, FIG. 6B illustrates updateable smart contracts as described herein where all data storage is coupled to the Client Contract and respective Service Contracts with no data storage requirements provide updated computation results to the Client Contract via an interface. The data remains accessible after the update yet the original Client Contract is not affected.

Those skilled in the art will appreciate that the same data is being stored to the blockchain in the illustrated embodiments as was stored prior to implementation of the updateable smart contracts as described herein. In accordance with the embodiments of the updateable smart contracts described herein, if one knew what to look for, one would see the contract split into two parts, and any stored data being associated with just one of those parts. There is no significant change to the block inserted into the blockchain. The embodiments described herein still use the conventional blockchain in the conventional manner while providing a way to change Smart Contract programs to get around their limitations on updates. The structure of the blocks is not changed, just the number of transactions and the associated amount of storage made available in the blocks. By providing such updateability, usage of Smart Contracts should expand as they no longer become obsolete as a result of being non-updateable.

Computer Resources

Those skilled in the art also will appreciate that the updateable smart contracts described herein may be implemented using appropriate computing resources (e.g., one or more processors) and memory resources that store software including instructions for implementing the methods and systems described herein. Memory for storing instructions for implementing the systems and methods described herein include Random Access Memory (RAM), and semiconductor memory devices, which may include, in some embodiments, storage locations in semiconductors such as registers. Specific examples of static memory include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

One or more machines implementing the updateable smart contracts described herein may further include a display device, an input device (e.g., a keyboard), and a user interface (UI) navigation device (e.g., a mouse). In an example, the display device, input device, and UI navigation device may be a touch screen display. The one or more machines may additionally include a mass storage (e.g., drive unit), a signal generation device (e.g., a speaker), a network interface device, and one or more sensors for collecting data. The one or more machines may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor and/or instructions may include processing circuitry and/or transceiver circuitry.

In sample embodiments, the storage device may include a machine-readable medium on which is stored one or more sets of data structures or instructions (e.g., software) embodying or utilized by any one or more of the techniques or functions described herein. The instructions may also reside, completely or at least partially, within the main memory, within static memory, or within the hardware processor during execution thereof by the machine. In an example, one or any combination of the hardware processor, the main memory, the static memory, or the storage device may constitute machine readable media. Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks. While the machine-readable medium is generally a single medium, the term "machine readable medium" may include a single medium or multiple media (e.g., a centralized or distributed database, and/or associated caches and servers) configured to store the one or more instructions.

An apparatus of the machine(s) implementing the updateable smart contracts described herein may be one or more of a hardware processor (e.g., a central processing unit (CPU), a graphics processing unit (GPU), a hardware processor core, or any combination thereof), a main memory, and a static memory, sensors, network interface device, antennas, a display device, an input device, a UI navigation device, a mass storage, instructions, a signal generation device, and an output controller. The apparatus may be configured to perform one or more of the methods and/or operations disclosed herein. The apparatus may be intended as a component of the machine to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

Figure 7:
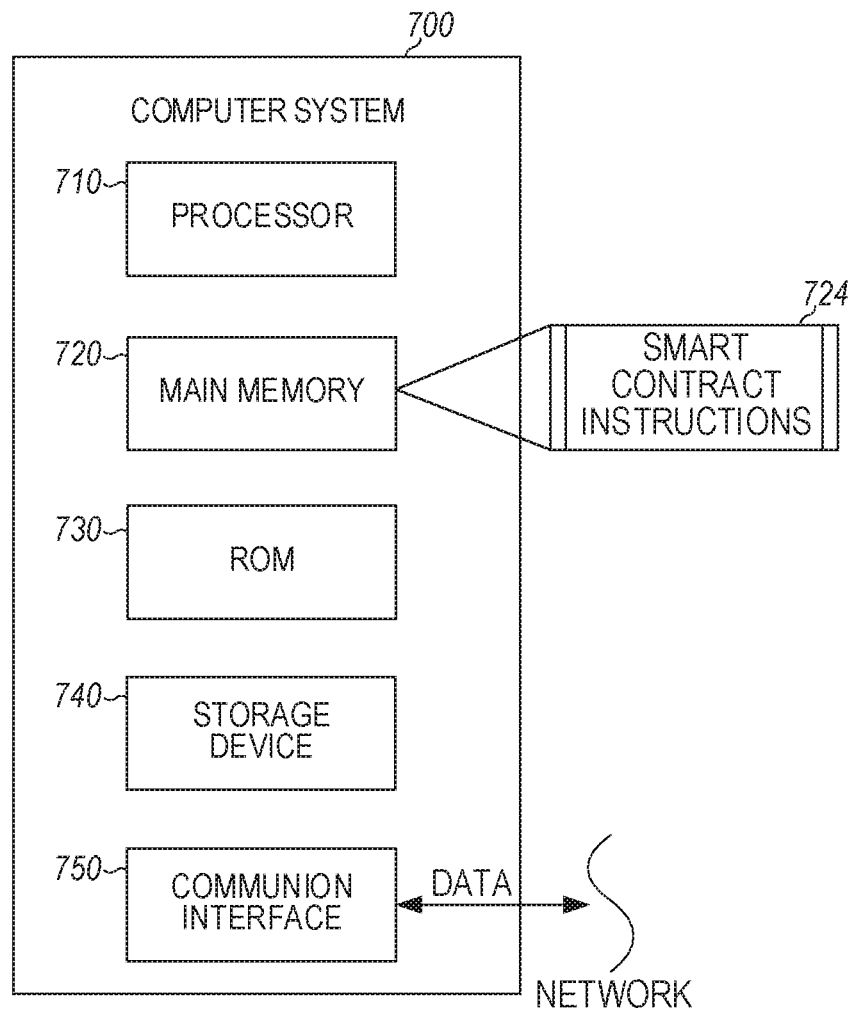
FIG. 7 is a block diagram that illustrates a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network computer system for managing smart contracts. The updateable smart contracts described herein may also be implemented using a combination of multiple computer systems such as described by FIG. 7.

In one implementation, the computer system 700 includes processing resources, a main memory 720, a read-only memory (ROM) 730, a storage device 740, and a communication interface 750. The computer system 700 includes at least one processor 710 for processing information stored in the main memory 720, such as provided by a random-access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks (e.g., a cellular network) through use of a network link (wireless or wired). Using the network link, the computer system 700 can communicate with one or more computing devices and one or more servers. The executable instructions stored in the memory 730 can include instructions 724 to perform one or more of the methods described herein when executed.

By way of example, the instructions and data stored in the memory 720 can be executed by the processor 710 to implement the updateable smart contracts as described herein. The processor 710 executes instructions for the software and/or other logic to perform one or more processes, steps, and other functions described with implementations such as described by FIG. 1 through FIG. 6.

Examples described herein are related to the use of the computer system 700 for implementing the techniques described. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of, or in combination with, software instructions to implement examples described herein. Thus, the examples described are not limited to any specific combination of hardware circuitry and software.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

It is contemplated for examples described herein to extend to individual elements and concepts described, independently of other concepts, ideas, or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

Executable Instructions and Machine-Storage Medium

The various memories i.e., 720, 730, and/or memory of the processor unit(s) 710) and/or storage device 740 may store one or more sets of instructions and data structures (e.g., instructions) 724 embodying or utilized by any one or more of the methodologies or functions described herein. These instructions, when executed by processor unit(s) 710 cause various operations to implement the disclosed examples.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 740 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks: magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The term "machine readable medium" may include any medium that is capable of storing, encoding, or carrying instructions for execution by one or more machines and that cause the one or more machines to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. As used herein, "machine readable media" excludes a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, a network interface device may include one or more physical jacks (e.g., Ethernet, coaxial, or phone jacks) or one or more antennas to connect to a communications network. In an example, a network interface device may include one or more antennas to wirelessly communicate using at least one of single-input multiple-output (SIMO), multiple-input multiple-output (MIMO), or multiple-input single-output (MISO) techniques. In some examples, the network interface device may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software.

Certain embodiments are described herein as numbered examples 1, 2, 3, etc. These numbered examples are provided as examples only and do not limit the subject technology.

Example 1 is a system for implementing a smart contract on a blockchain, comprising a memory to store instructions and one or more processors using the instructions stored in the memory to perform operations including segregating the smart contract into an updateable smart contract and a non-updateable smart contract, where the non-updateable smart contract handles persistent data storage and retrieval to the blockchain for data that needs to be permanently accessible and the updateable smart contract does not contain data storage and retrieval to the blockchain; deploying the non-updateable smart contract and a first version of the updateable smart contract; providing the non-updateable smart contract with an address of the first version of the updateable smart contract; the non-updateable smart contract storing the address of the first version of the updateable smart contract to the blockchain; the non-updateable smart contract retrieving permanent data from the blockchain and passing the permanent data to the first version of the updateable smart contract; the updateable smart contract performing a computation on the permanent data and returning updated data based on the computation of the permanent data back to the non-updateable smart contract; and the non-updateable smart contract storing the updated data to the blockchain.

Example 2 is a system as in Example 1, further comprising a fixed interface that connects the updateable smart contract and the non-updateable smart contract, wherein the address of the first version of the updateable smart contract is provided to the non-updateable smart contract via the fixed interface, the non-updateable smart contract passes the permanent data to the first version of the updateable smart contract via the fixed interface, and the updateable smart contract returns updated data based on the computation of the permanent data back to the non-updateable smart contract via the fixed interface.

Example 3 is a system as in any preceding example, wherein the memory stores further instructions to perform operations including providing the non-updateable smart contract with an address of the first version of the updateable smart contract by calling an interface of the non-updateable smart contract with the address of the first version of the updateable smart contract.

Example 4 is a system as in any preceding example, wherein the memory stores further instructions to perform further operations including deploying a second version of the updateable smart contract; calling the interface of the non-updateable smart contract with an address of the second version of the updateable smart contract; the non-updateable smart contract storing the address of the second version of the updateable smart contract to the blockchain; and the non-updateable smart contract invoking the second version of the updateable smart contract by retrieving the address of the second version of the updateable smart contract from the blockchain and calling the second version of the updateable smart contract at the retrieved address.

Example 5 is a system as m any preceding example, wherein the segregating comprises segregating the smart contract into the non-updateable smart contract and a plurality of the updateable smart contracts, the deploying comprises deploying first and second versions of each updateable smart contract, the calling comprises calling respective interfaces with addresses of the respective versions of the respective updateable smart contracts, the storing comprises storing the addresses of the respective versions of the respective updateable smart contracts to the blockchain, and the invoking comprises retrieving the addresses of the second versions of the updateable smart contracts from the blockchain and calling the second versions of the updateable smart contracts at the retrieved addresses.

Example 6 is a system as in any preceding example, wherein the segregating comprises segregating the smart contract into the non-updateable smart contract and a plurality of the updateable smart contracts, the deploying comprises deploying first and second versions of each updateable smart contract, the calling comprises calling the interface with an identifier associated with and the respective addresses of the respective updateable smart contracts, the storing comprises storing the identifiers and addresses of the respective versions of the respective updateable smart contracts to the blockchain, and the invoking comprises retrieving the identifiers and addresses of the second versions of the updateable smart contracts from the blockchain and calling the second versions of the updateable smart contracts identified by the identifier at the retrieved addresses.

Example 7 is a system as in any preceding example, wherein the updateable smart contract is self-registering and the calling comprises the self-registering updateable smart contract calling the interface of the non-updateable smart contract with the address of the respective versions of the self-registering updateable smart contract.

Example 8 is a system as in any preceding example, wherein the segregating comprises segregating the smart contract into the non-updateable smart contract and a plurality of the updateable smart contracts, the deploying comprises deploying first and second versions of each updateable smart contract, the updateable smart contract is self-registering and the calling comprises the self-registering updateable smart contracts calling respective interfaces of the non-updateable smart contract with the addresses of the respective versions of the respective self-registering updateable smart contracts, the storing comprises storing the addresses of the respective versions of the respective updateable smart contracts to the blockchain, and the invoking comprises retrieving the addresses of the second versions of the updateable smart contracts from the blockchain and calling the second versions of the updateable smart contracts at the retrieved addresses.

Example 9 is a system as in any preceding example, wherein the memory stores further instructions to perform operations including the non-updateable smart contract retrieving permanent data from the blockchain and passing the permanent data to the updateable smart contract, and the updateable smart contract computing and returning data based on computation of the permanent data back to the non-updateable smart contract for permanent storage to the blockchain.

Example 10 is a system as in any preceding example, wherein the memory stores further instructions to perform operations including segregating the smart contract into a plurality of non-updateable smart contracts.

Example 11 is a system as in any preceding example, wherein the memory stores further instructions to perform operations including hard-coding an address of the non-updateable smart contract into the first version of the updateable smart contract prior to deploying the first version of the updateable smart contract; deploying a second version of the updateable smart contract; calling the second version of the updateable smart contract; the second version of the updateable smart contract calling the non-updateable smart contract at the hard-coded address; and the non-updateable smart contract storing any permanent data to the blockchain.

Example 12 is a method of one or more processors performing the steps set forth in any preceding example.

Example 13 is a non-transitory computer-readable medium storing computer instructions for updating a smart contract implemented on a blockchain according to any of Examples 1-11.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules include a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of such features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

It is understood by those skilled in the art that the claims encompass specific embodiments as well as embodiments that are not specifically described herein but which may include equivalent components and steps to those described herein as well as other features and modifications that would be apparent to those skilled in the art.

What is claimed is:

1. A method for updating a smart contract executed implemented on a blockchain, comprising:
    segregating the smart contract into an updateable smart contract and a non-updateable smart contract, where the non-updateable smart contract handles persistent data storage and retrieval to the blockchain for data that needs to be permanently accessible and the updateable smart contract does not contain data storage and retrieval to the blockchain;
    deploying the non-updateable smart contract and a first version of the updateable smart contract;
    the first version of the updateable smart contract self-registering with the non-updateable smart contract upon deployment by providing the non-updateable smart contract with an address of the first version of the updateable smart contract;
    the non-updateable smart contract storing the address of the first version of the updateable smart contract to the blockchain;
    the non-updateable smart contract retrieving permanent data from the blockchain and passing the permanent data to the first version of the updateable smart contract;
    the updateable smart contract performing a computation on the permanent data and returning updated data based on the computation of the permanent data back to the non-updateable smart contract; and
    the non-updateable smart contract storing the updated data to the blockchain.

2. A method as in claim 1, wherein the updateable smart contract and the non-updateable smart contract are connected via a fixed interface, and wherein the address of the first version of the updateable smart contract is provided to the non-updateable smart contract via the fixed interface, the non-updateable smart contract passes the permanent data to the first version of the updateable smart contract via the fixed interface, and the updateable smart contract returns updated data based on the computation of the permanent data back to the non-updateable smart contract via the fixed interface.

3. A method as in claim 1, wherein providing the non-updateable smart contract with an address of the first version of the updateable smart contract comprises calling an interface of the non-updateable smart contract with the address of the first version of the updateable smart contract.

4. A method as in claim 3, further comprising:
    deploying a second version of the updateable smart contract;
    calling the interface of the non-updateable smart contract with an address of the second version of the updateable smart contract;
    the non-updateable smart contract storing the address of the second version of the updateable smart contract to the blockchain; and
    the non-updateable smart contract invoking the second version of the updateable smart contract by retrieving the address of the second version of the updateable smart contract from the blockchain and calling the second version of the updateable smart contract at the retrieved address.

5. A method as claimed in claim 4, wherein the segregating comprises segregating the smart contract into the non-updateable smart contract and a plurality of the updateable smart contracts, the deploying steps comprise deploying first and second versions of each updateable smart contract, the calling steps comprise calling respective interfaces with addresses of the respective versions of the respective updateable smart contracts, the storing steps comprise storing the addresses of the respective versions of the respective updateable smart contracts to the blockchain, and the invoking step comprises retrieving the addresses of the second versions of the updateable smart contracts from the blockchain and calling the second versions of the updateable smart contracts at the retrieved addresses.

6. A method as in claim 4, wherein the segregating comprises segregating the smart contract into the non-updateable smart contract and a plurality of the updateable smart contracts, the deploying steps comprise deploying first and second versions of each updateable smart contract, the calling steps comprise calling the interface with an identifier associated with and the respective addresses of the respective updateable smart contracts, the storing steps comprise storing the identifiers and addresses of the respective versions of the respective updateable smart contracts to the blockchain, and the invoking step comprises retrieving the identifiers and addresses of the second versions of the updateable smart contracts from the blockchain and calling the second versions of the updateable smart contracts identified by the identifier at the retrieved addresses.

7. A method as in claim 4, wherein each version of the updateable smart contract is self-registering with its address and the calling steps comprise respective versions of the self-registering updateable smart contract calling the interface of the non-updateable smart contract with the address of the respective versions of the self-registering updateable smart contract.

8. A method as in claim 4, wherein the segregating comprises segregating the smart contract into the non-updateable smart contract and a plurality of the self-registering updateable smart contracts, the deploying steps comprise deploying first and second versions of each self-registering updateable smart contract, and the calling steps comprise the self-registering updateable smart contracts calling respective interfaces of the non-updateable smart contract with the addresses of the respective versions of the respective self-registering updateable smart contracts, the storing steps comprise storing the addresses of the respective versions of the respective updateable smart contracts to the blockchain, and the invoking step comprises retrieving the addresses of the second versions of the updateable smart contracts from the blockchain and calling the second versions of the updateable smart contracts at the retrieved addresses.

9. A method as in claim 4, wherein the non-updateable smart contract retrieves permanent data from the blockchain and passes the permanent data to the updateable smart contract, and the updateable smart contract computes and returns data based on computation of the permanent data back to the non-updateable smart contract for permanent storage to the blockchain.

10. A method as in claim 4, wherein the segregating comprises segregating the smart contract into a plurality of non-updateable smart contracts.

11. A method as in claim 1, farther comprising:
hard-coding an address of the non-updateable smart contract into the first version of the updateable smart contract prior to deploying the first version of the updateable smart contract;
deploying a second version of the updateable smart contract;
calling the second version of the updateable smart contract;
the second version of the updateable smart contract calling the non-updateable smart contract at the hard-coded address; and
the non-updateable smart contract storing any permanent data to the blockchain.

12. A system for executing a smart contract on a blockchain, comprising:
a memory to store instructions; and
one or more processors using the instructions stored in the memory to perform operations including:
segregating the smart contract into an updateable smart contract and a non-updateable smart contract, where the non-updateable smart contract handles persistent data storage and retrieval to the blockchain for data that needs to be permanently accessible and the updateable smart contract does not contain data storage and retrieval to the blockchain;
deploying the non-updateable smart contract and a first version of the updateable smart contract;
the first version of the updateable smart contract self-registering with the non-updateable smart contract upon deployment by providing the non-updateable smart contract with an address of the first version of the updateable smart contract;
the non-updateable smart contract storing the address of the first version of the updateable smart contract to the blockchain;
the non-updateable smart contract retrieving permanent data from the blockchain and passing the permanent data to the first version of the updateable smart contract;
the updateable smart contract performing a computation on the permanent data and returning updated data based on the computation of the permanent data back to the non-updateable smart contract; and
the non-updateable smart contract storing the updated data to the blockchain.

13. A system as in claim 12, further comprising a fixed interface that connects the updateable smart contract and the non-updateable smart contract, wherein the address of the first version of the updateable smart contract is provided to the non-updateable smart contract via the fixed interface, the non-updateable smart contract passes the permanent data to the first version of the updateable smart contract via the fixed interface, and the updateable smart contract returns updated data based on the computation of the permanent data back to the non-updateable smart contract via the fixed interface.

14. A system as in claim 12, wherein the memory stores further instructions to perform operations including providing the non-updateable smart contract with an address of the first version of the updateable smart contract by calling an interface of the non-updateable mart contract with the address of the first version of the updateable smart contract.

15. A system as in claim 14, wherein the memory stores further instructions to perform further operations including:
deploying a second version of the updateable smart contract;
calling the interface of the non-updateable smart contract with an address of the second version of the updateable smart contract;
the non-updateable smart contract storing the address of the second version of the updateable smart contract to the blockchain; and
the non-updateable smart contract invoking the second version of the updateable smart contract by retrieving the address of the second version of the updateable smart contract from the blockchain and calling the second version of the updateable smart contract at the retrieved address.

16. A system as in claim 15, wherein the segregating comprises segregating the smart contract into the non-updateable smart contract and a plurality of the updateable smart contracts, the deploying comprises deploying first and second versions of each updateable smart contract, the calling comprises calling respective interfaces with addresses of the respective versions of the respective updateable smart contracts, the storing comprises storing the addresses of the respective versions of the respective updateable smart contracts to the blockchain, and the invoking comprises retrieving the addresses of the second versions of the updateable smart contracts from the blockchain and calling the second versions of the updateable smart contracts at the retrieved addresses.

17. A system as in claim 15, wherein the segregating comprises segregating the smart contract into the non-updateable smart contract and a plurality of the updateable smart contracts, the deploying comprises deploying first and second versions of each updateable smart contract, the calling comprises calling the interface with an identifier associated with and the respective addresses of the respective updateable smart contracts, the storing comprises storing the identifiers and addresses of the respective versions of the respective updateable smart contracts to the blockchain, and the invoking comprises retrieving the identifiers and addresses of the second versions of the updateable smart contracts from the blockchain and calling the second versions of the updateable smart contracts identified by the identifier at the retrieved addresses.

18. A system as in claim 15, wherein each version of the updateable smart contract is self-registering with its address and the calling comprises respective versions of the self-registering updateable smart contract calling the interface of the non-updateable smart contract with the address of the respective versions of the self-registering updateable smart contract.

19. A system as in claim 15, wherein the segregating comprises segregating the smart contract into the non-updateable smart contract and a plurality of self-registering updateable smart contracts, the deploying comprises deploying first and second versions of each self-registering updateable smart contract, and the calling comprises the self-registering updateable smart contracts calling respective interfaces of the non-updateable smart contract with the addresses of the respective versions of the respective self-registering updateable smart contracts, the storing comprises storing the addresses of the respective versions of the respective updateable smart contracts to the blockchain, and the invoking comprises retrieving the addresses of the second versions of the updateable smart contracts from the blockchain and calling the second versions of the updateable smart contracts at the retrieved addresses.

20. A system as in claim 15, wherein the memory stores further instructions to perform operations including the non-updateable smart contract retrieving permanent data from the blockchain and passing the permanent data to the updateable smart contract, and the updateable smart contract computing and returning data based on computation of the permanent data back to the non-updateable smart contract for permanent storage to the blockchain.

21. A system as in claim 15, wherein the memory stores further instructions to perform operations including segregating the smart contract into a plurality of non-updateable smart contracts.

22. A system as in claim 12, wherein the memory stores further instructions to perform operations including:
   hard-coding an address of the non-updateable smart contract into the first version of the updateable smart contract prior to deploying the first version of the updateable smart contract;
   deploying a second version of the updateable smart contract;
   calling the second version of the updateable smart contract;
   the second version of the updateable smart contract calling the non-updateable smart contract at the hard-coded address; and
   the non-updateable smart contract storing any permanent data to the blockchain.

23. A non-transitory computer-readable medium storing computer instructions for updating a smart contract executed on a blockchain, that when executed by one or more processors, cause the one or more processors to perform the steps of:
   segregating the smart contract into an updateable smart contract and a non-updateable smart contract, where the non-updateable smart contract handles persistent data storage and retrieval to the blockchain for data that needs to be permanently accessible and the updateable smart contract does not contain data storage and retrieval to the blockchain;
   deploying the non-updateable smart contract and a first version of the updateable smart contract;
   the first version of the updateable smart contract self-registering with the non-updateable smart contract upon deployment by providing the non-updateable smart contract with an address of the first version of the updateable smart contract;
   the non-updateable smart contract storing the address of the first version of the updateable smart contract to the blockchain;
   the non-updateable smart contract retrieving permanent data from the blockchain and passing the permanent data to the first version of the updateable smart contract;
   the updateable smart contract performing a computation on the permanent data and returning updated data based on the computation of the permanent data back to the non-updateable smart contract; and
   the non-updateable smart contract storing the updated data to the blockchain.

* * * * *